US012738636B2

(12) United States Patent
Terashita et al.

(10) Patent No.: US 12,738,636 B2
(45) Date of Patent: Sep. 15, 2026

(54) ANTENNA DEVICE

(71) Applicant: YOKOWO CO., LTD., Tokyo (JP)

(72) Inventors: Noritaka Terashita, Tomioka (JP); Motohisa Ono, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 0 days.

(21) Appl. No.: 18/450,991

(22) Filed: Aug. 16, 2023

(65) Prior Publication Data

US 2024/0006746 A1 Jan. 4, 2024

Related U.S. Application Data

(60) Division of application No. 17/884,430, filed on Aug. 9, 2022, now Pat. No. 11,855,340, which is a (Continued)

(51) Int. Cl.

*H01Q 5/35* (2015.01)
*H01Q 1/32* (2006.01)

(Continued)

(52) U.S. Cl.

CPC .......... *H01Q 1/3275* (2013.01); *H01Q 1/362* (2013.01); *H01Q 1/42* (2013.01); *H01Q 1/523* (2013.01); *H01Q 5/30* (2015.01); *H01Q 5/35* (2015.01); *H01Q 5/40* (2015.01); *H01Q 9/40* (2013.01); *H01Q 13/206* (2013.01); *H01Q 21/29* (2013.01); *H01Q 1/1214* (2013.01)

(58) Field of Classification Search

CPC ......... H01Q 1/32; H01Q 1/52; H01Q 5/30–40
See application file for complete search history.

(56) References Cited

U.S. PATENT DOCUMENTS 6,456,243 B1 * 9/2002 Poilasne ................ H01Q 5/371 343/702
7,079,079 B2 7/2006 Jo et al.

(Continued)

FOREIGN PATENT DOCUMENTS

CN 102893456 A 1/2013
CN 104282990 A 1/2015

(Continued)

OTHER PUBLICATIONS

Extended European Search Report dated Aug. 10, 2022, issued in corresponding European Patent Application No. 22175997.0.

(Continued)

*Primary Examiner* — Hasan Islam
(74) *Attorney, Agent, or Firm* — Morgan, Lewis & Bockius LLP

(57) ABSTRACT

An antenna device which includes a plurality of antennas in a common case and is capable of achieving downsizing while suppressing a decrease of an antenna gain, is provided. An antenna device includes a TEL antenna and a capacity loaded element in a common case. The capacity loaded element is located above the TEL antenna. A length of the capacity loaded element is a positive integer multiple of one-half a wavelength of a PCS band. The TEL antenna is arranged so as to avoid a voltage maximum point of a standing wave, of the PCS band, generated in the capacity loaded element.

8 Claims, 14 Drawing Sheets

1: ANTENNA DEVICE

Related U.S. Application Data continuation of application No. 16/066,890, filed as application No. PCT/JP2017/002191 on Jan. 23, 2017, now Pat. No. 11,456,524.

(60) Provisional application No. 62/297,195, filed on Feb. 19, 2016.

(51) Int. Cl.

| | |
|---|---|
| ***H01Q 1/36*** | (2006.01) |
| ***H01Q 1/42*** | (2006.01) |
| ***H01Q 1/52*** | (2006.01) |
| ***H01Q 5/30*** | (2015.01) |
| ***H01Q 5/40*** | (2015.01) |
| ***H01Q 9/40*** | (2006.01) |
| ***H01Q 13/20*** | (2006.01) |
| ***H01Q 21/29*** | (2006.01) |
| *H01Q 1/12* | (2006.01) |

(56) References Cited

U.S. PATENT DOCUMENTS

| | | | | |
|---|---|---|---|---|
| 7,864,123 | B2 | 1/2011 | Hill et al. | |
| 9,431,705 | B2 | 8/2016 | Basirat | |
| 2005/0062658 | A1 | 3/2005 | Magg et al. | |
| 2007/0229372 | A1* | 10/2007 | Desclos | H01Q 1/273 343/702 |
| 2007/0229376 | A1* | 10/2007 | Desclos | H01Q 1/273 343/718 |
| 2008/0117111 | A1 | 5/2008 | Ikeda et al. | |
| 2009/0207084 | A1 | 8/2009 | Ikeda et al. | |
| 2010/0013724 | A1 | 1/2010 | Ohshima et al. | |
| 2010/0265147 | A1 | 10/2010 | Wakui et al. | |
| 2010/0315305 | A1 | 12/2010 | Takisawa et al. | |
| 2012/0026050 | A1 | 2/2012 | Sampo et al. | |
| 2012/0154237 | A1* | 6/2012 | Ying | H01Q 5/378 343/833 |
| 2012/0223862 | A1* | 9/2012 | Kerselaers | H01Q 1/3275 343/700 MS |
| 2012/0326934 | A1 | 12/2012 | Wakui et al. | |
| 2012/0326935 | A1 | 12/2012 | Kang et al. | |
| 2013/0176180 | A1 | 7/2013 | Wakui et al. | |
| 2013/0229315 | A1 | 9/2013 | Duzdar et al. | |
| 2013/0249753 | A1 | 9/2013 | Asanuma et al. | |
| 2014/0002319 | A1 | 1/2014 | Lindenmeier et al. | |
| 2014/0292593 | A1 | 10/2014 | Thiam et al. | |
| 2014/0340267 | A1 | 11/2014 | Kim | |
| 2015/0380818 | A1 | 12/2015 | Svendsen et al. | |
| 2018/0261913 | A1 | 9/2018 | Imamura et al. | |

FOREIGN PATENT DOCUMENTS

| | | | |
|---|---|---|---|
| CN | 104868227 | A | 8/2015 |
| EP | 0 987 788 | A2 | 3/2000 |
| JP | H06-310930 | A | 11/1994 |
| JP | 2000-295017 | A | 10/2000 |
| JP | 2003-283240 | A | 10/2003 |
| JP | 2003-309424 | A | 10/2003 |
| JP | 2004-048369 | A | 2/2004 |
| JP | 2010-021856 | A | 1/2010 |
| JP | WO2008-062746 | A1 | 3/2010 |
| JP | 2012-010409 | A | 1/2012 |
| JP | 2012-034226 | A | 2/2012 |
| JP | 4913900 | B1 | 4/2012 |
| JP | 2012-124714 | A | 6/2012 |
| JP | 5237617 | B2 | 7/2013 |
| WO | 03/098735 | A1 | 11/2003 |
| WO | 2012/077389 | A1 | 6/2012 |
| WO | 2012/123125 | A1 | 9/2012 |
| WO | 2015/003384 | A1 | 1/2015 |

OTHER PUBLICATIONS

Extended European Search Report dated Sep. 24, 2019, issued in corresponding European Patent Application No. 17752899.9.
Office Action dated Jun. 19, 2020, issued in corresponding Chinese Patent Application No. 201780005280.7.
Japanese Notice of Opposition dated Jun. 18, 2019, issued in corresponding Japanese Patent Application No. 2019-700360. (Note: All references cited therein have been submitted previously on Jun. 28, 2018, and Nov. 27, 2019 and, collectively, the references represent a concise explanation of the opposition).
Search Report (with partial translation) and Written Opinion dated Apr. 4, 2017, issued in corresponding International Application No. PCT/JP2017/002191.

* cited by examiner

1: ANTENNA DEVICE

1A: ANTENNA DEVICE

1A: ANTENNA DEVICE

FIRST COMPARATIVE EXAMPLE

SECOND COMPARATIVE EXAMPLE

ANTENNA DEVICE

TECHNICAL FIELD

The present invention relates to an antenna device including two or more antennas within a common case.

BACKGROUND ART

In recent years, a vehicle-mounted antenna device called a shark fin antenna has been developed. There is a tendency that an information communication system antenna such as a TEL antenna is installed in the vehicle-mounted antenna in addition to a broadcast system receiving antenna such as an AM/FM antenna (for example, Patent Document 1).

PRIOR ART DOCUMENTS

Patent Documents

Patent Document 1: JP-A-2012-124714

SUMMARY OF THE INVENTION

Problems to be Solved by the Invention

When a plurality of antennas is provided within a limited space in a case, it is a problem that a distance between the antennas cannot be sufficiently maintained and a gain of the antenna is decreased. On the other hand, when a distance between antennas is increased inside a case, it is a problem that the case becomes large and cannot be downsized.

The present invention has been achieved in view of such circumstances, and an object of the present invention is to provide an antenna device which includes a plurality of antennas within a common case and which can be downsized while suppressing a decrease of an antenna gain.

Means for Solving the Problems

An aspect of the present invention is an antenna device. The antenna device includes first and second antennas provided in a common case, and the second antenna has a plate shape and is located above the first antenna, and the first antenna is arranged so as to avoid a voltage maximum point of a standing wave, of a frequency band of the first antenna, generated in the second antenna.

The first antenna may be located or extend in a range in which a horizontal distance from a voltage minimum point of the standing wave generated in the second antenna is set within one-eighth a wavelength of the standing wave.

The second antenna may have a first plate-shaped part located above the first antenna, and the first antenna may be located below a center part of the first plate-shaped part, and a length of the first plate-shaped part may be an odd multiple of one-half a wavelength of the frequency band of the first antenna.

The second antenna may have the first plate-shaped part located above the first antenna, and a second plate-shaped part electrically connected to the first plate-shaped part through a filter part that cuts off the frequency band of the first antenna.

The second antenna may have a first plate-shaped part located above the first antenna, and a second plate-shaped part electrically connected to the first plate-shaped part through a meander line.

The first plate-shaped part and the second plate-shaped part may be arranged with the first plate-shaped part separated from the second plate-shaped part in a front-rear direction.

In the second antenna, at least a portion located above the first antenna may be divided in a right-left direction.

A helical element electrically connected to the second antenna may be included.

The helical element may be wound helically and elliptically when viewed from a winding axis direction of the helical element.

A base that defines a storage space of the first and second antennas together with the case may be included, and the first antenna may have a portion substantially vertical to the base.

The first antenna may be a TEL antenna, a TV antenna, a keyless entry antenna, an inter-vehicle communication antenna or a WiFi antenna, and the second antenna may be an AM/FM antenna or a DAB receiving antenna.

A helical element electrically connected to the second antenna may be included, and the helical element may be arranged in a state shifted from a center of the case, in the right-left direction, for holding the second antenna.

A winding axis of the helical element may be obliquely inclined to an upward-downward direction.

A position of the helical element in the upward-downward direction may be constructed so as not to overlap with the second antenna.

The antenna device may include a holder for holding the helical element, and the holder may hold the helical element from an outer peripheral side or an inner peripheral side.

The holder may have a groove for holding the helical element.

The base may have a step on a lower surface.

The helical element may have a first helical element, and a second helical element grounded through the filter part that cuts off the frequency band of the first antenna.

The antenna device may include a conductor plate spring for pinching the first antenna, and the conductor plate spring or a portion of the first antenna pinched by the conductor plate spring may have a protrusion.

The antenna device may include a third antenna provided inside the case, and an upward portion of the third antenna may be covered with a parasitic element.

A second filter part for increasing an impedance of a TEL band may be provided between the first helical element and an amplifier for amplifying a frequency of the second antenna.

One and the other of the second antenna divided in the right-left direction may be joined in the right-left direction.

The first antenna may extend in an upward direction from a portion between one and the other of the second antenna divided in the right-left direction.

Conversions of any combinations of the above components and representation of the present invention between methods, systems, etc. are effective as aspects of the present invention.

Advantages of the Invention

According to the invention, it is possible to provide an antenna device which includes a plurality of antennas in the common case and which is downsized while suppressing a decrease of an antenna gain.

MODES FOR CARRYING OUT THE INVENTION

Preferred embodiments of the present invention will hereinafter be described in detail with reference to the drawings. In addition, the same numerals are assigned to the same or equivalent components, members, etc. shown in each of the drawings, and overlap explanation is omitted properly. The embodiments are mealy examples and do not limit the invention. All features described in the embodiments and combinations of the features are not necessarily essential to the invention.

First Embodiment

Figure 1:
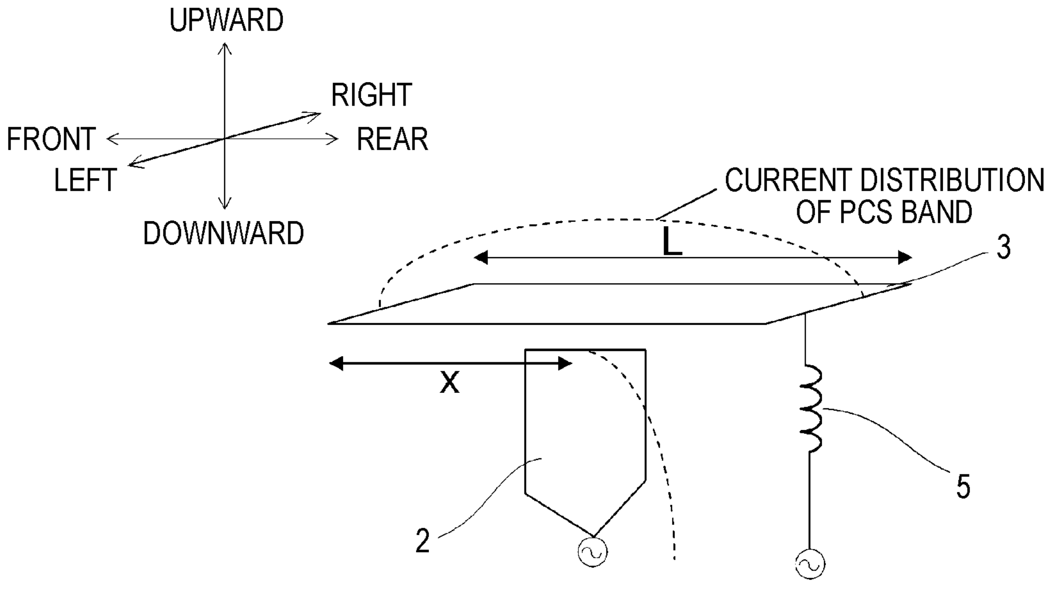
FIG. 1 is a schematic diagram of an antenna device 1 according to a first embodiment of the present invention.

A first embodiment of the present invention will be described with reference to FIGS. 1 to 5. FIG. 1 is a schematic diagram of an antenna device 1 according to the first embodiment. In FIG. 1, front-rear, upward-downward and right-left directions in the antenna device 1 are defined. A direction which is perpendicular to the upward-downward direction is a horizontal direction. The front-rear direction is a longitudinal direction of the antenna device 1, and the right-left direction is a width direction of the antenna device 1. The front direction is a traveling direction when the antenna device 1 is mounted on a vehicle. The right-left direction is defined with reference to a state viewing the front which is the traveling direction. The antenna device 1 is for being mounted on the vehicle, and is attached to, for example, a roof of the vehicle. The antenna device 1 includes a TEL antenna 2 as a first antenna, a capacity loaded element 3 as a second antenna, and an AM/FM antenna having a helical element (AM/FM coil) 5 inside a case (not shown). AM/FM broadcasting can be received by the capacity loaded element 3 and the helical element 5.

The TEL (Telephone) antenna 2 is, for example, a conductor pattern on a substrate. A frequency band of the TEL antenna 2 is a PCS (Personal Communications Service) band. A frequency of the PCS band is in a range from 1850 to 1990 MHz, but herein, 1900 MHz which is a center frequency of the PCS band is adopted as a representative value. The TEL antenna 2 is in a plane parallel to the front-rear direction and the upward-downward direction. The TEL antenna 2 is preferably a wide band antenna capable of sending and receiving an AMPS band (Advanced Mobile Phone System) and the PCS band. A frequency of the AMPS band is in a range from 824 to 894 MHz.

The capacity loaded element 3 is a plate-shaped component formed by processing a metal plate (conductor plate) made of, for example, stainless steel. The capacity loaded element 3 is located above the TEL antenna 2. When the TEL antenna 2 is located below a position of an odd multiple of one-fourth the wavelength λ from an end of the capacity loaded element 3, the length L of the capacity loaded element 3 in the front-rear direction is preferably a positive integer multiple of one-half the wavelength λ. Here, the wavelength λ is a wavelength of the PCS band (TEL band). When the TEL antenna 2 is located below the center of the capacity loaded element 3, the length L of the capacity loaded element 3 in the front-rear direction is preferably an odd multiple of one-half the wavelength λ. In an example of FIG. 1, the length L of the capacity loaded element 3 in the front-rear direction is $L=\lambda/2$. FIG. 1 shows a current distribution of the PCS band generated in the capacity loaded element 3 by a broken line. Positions in which the current distribution is minimized, that is, the front end and the rear end of the capacity loaded element 3 in the example of FIG. 1, are voltage maximum points, respectively. A position in which the current distribution is maximized, that is, a center position of the capacity loaded element 3 in the front-rear direction in the example of FIG. 1, is a voltage minimum point. In addition, when the TEL antenna 2 is the wide band antenna capable of sending and receiving the AMPS band and the PCS band, the capacity loaded element 3 is set in an electrical length which does not resonate with the AMPS band. In addition, when the capacity loaded element 3 is set in the electrical length which does not resonate with the AMPS band (for example, about one-fourth or less the wavelength λ of the AMPS band), an adverse effect from electrical coupling to the capacity loaded element 3 is not created even in the case of arranging the TEL antenna 2 in any position below the capacity loaded element 3 as far as sending and receiving is carried out in the AMPS band.

A distance x, in the front-rear direction, from the front end of the capacity loaded element 3 to a center position of the TEL antenna 2 in the front-rear direction is set so as to avoid a voltage maximum point of a standing wave of the PCS band generated in the capacity loaded element 3, preferably, so that the center position of the TEL antenna 2 in the front-rear direction is located at a voltage minimum point of the capacity loaded element 3 or in a range from the voltage minimum point to λ/8, or so that the TEL antenna 2 extends at the voltage minimum point of the capacity loaded element 3 or in a range from the voltage minimum point to λ/8.

Figure 2:
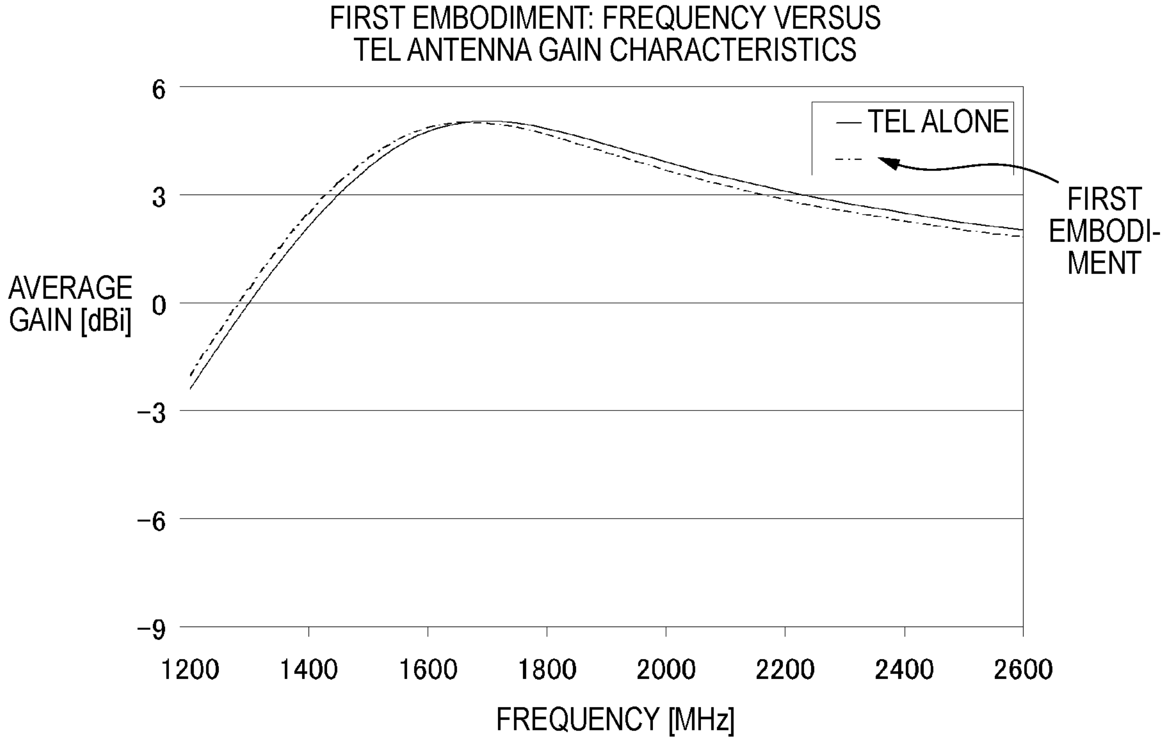
FIG. 2 is a characteristic diagram by simulation showing a relation (a chain line) between a frequency and an average gain of a TEL antenna 2 of the antenna device 1 together with a relation (a solid line) between a frequency and an average gain of the TEL antenna 2 alone (in the absence of a capacity loaded element 3).

FIG. 2 is a characteristic diagram by simulation showing a relation (a chain line) between a frequency and an average gain of the TEL antenna 2 of the antenna device 1 together with a relation (a solid line) between a frequency and an average gain of the TEL antenna 2 alone (in an absence of the capacity loaded element 3). The characteristics of the chain line shown in FIG. 2 are characteristics in a case of arranging a center position of the TEL antenna 2 in the front-rear direction so as to be located just below the voltage minimum point of the capacity loaded element 3. As shown in FIG. 2, the TEL antenna 2 of the antenna device 1 can obtain antenna gain characteristics similar to those in a case of the TEL antenna 2 alone regardless of being located below the capacity loaded element 3.

Figure 3:
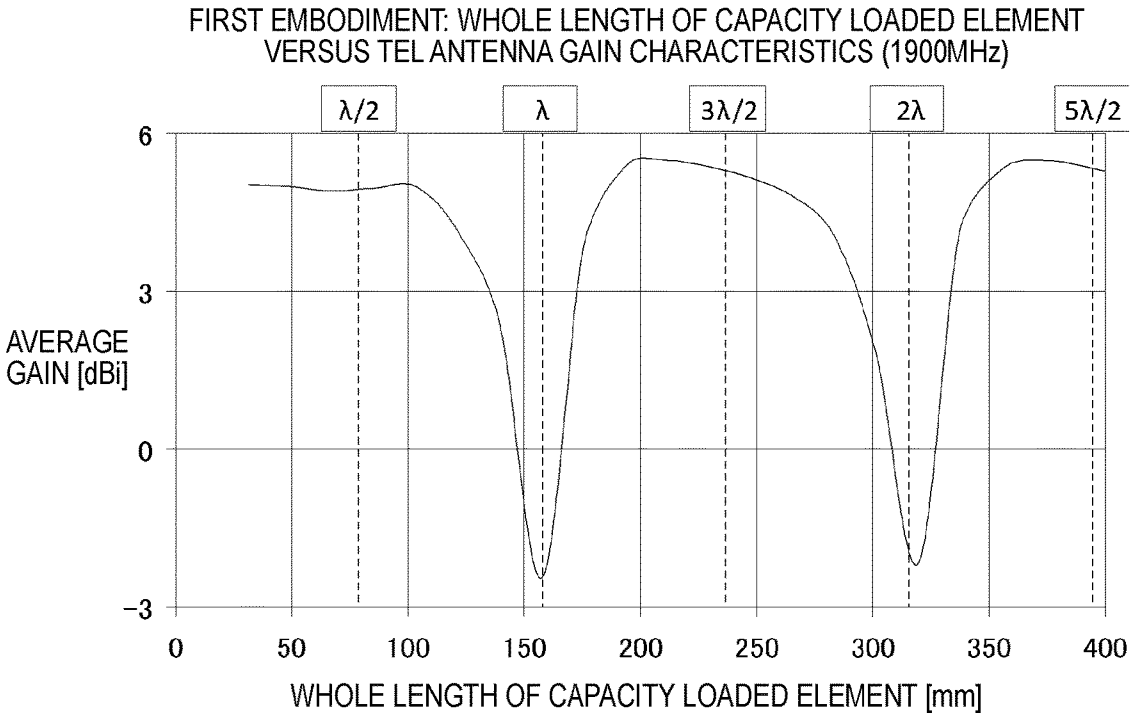
FIG. 3 is a characteristic diagram by simulation showing a relation between the whole length (length L in a front-rear direction) of the capacity loaded element 3 and an average gain of the TEL antenna 2 at 1900 MHz in a case of arranging the TEL antenna 2 just below a center position of the capacity loaded element 3 in a front-rear direction in the antenna device 1.

FIG. 3 is a characteristic diagram by simulation showing a relation between the whole length (length L in the front-rear direction) of the capacity loaded element 3 and an average gain of the TEL antenna 2 at 1900 MHz in the case of arranging the TEL antenna 2 just below a center position of the capacity loaded element 3 in the front-rear direction in the antenna device 1. The reason why the average gain is considerably decreased in the vicinity in which the length L of the capacity loaded element 3 in the front-rear direction is λ and 2λ in FIG. 3 is because when the length L of the capacity loaded element 3 in the front-rear direction is λ and 2λ, the center position of the TEL antenna 2 in the front-rear direction is located just below a voltage maximum point of the capacity loaded element 3. When the length L of the capacity loaded element 3 in the front-rear direction is λ/2 and 3λ/2 (described below in FIG. 5), a good gain can be obtained by setting the center position of the TEL antenna 2 in the front-rear direction at the voltage minimum point of the capacity loaded element 3 or in a range from the voltage minimum point to λ/8.

Figure 4:
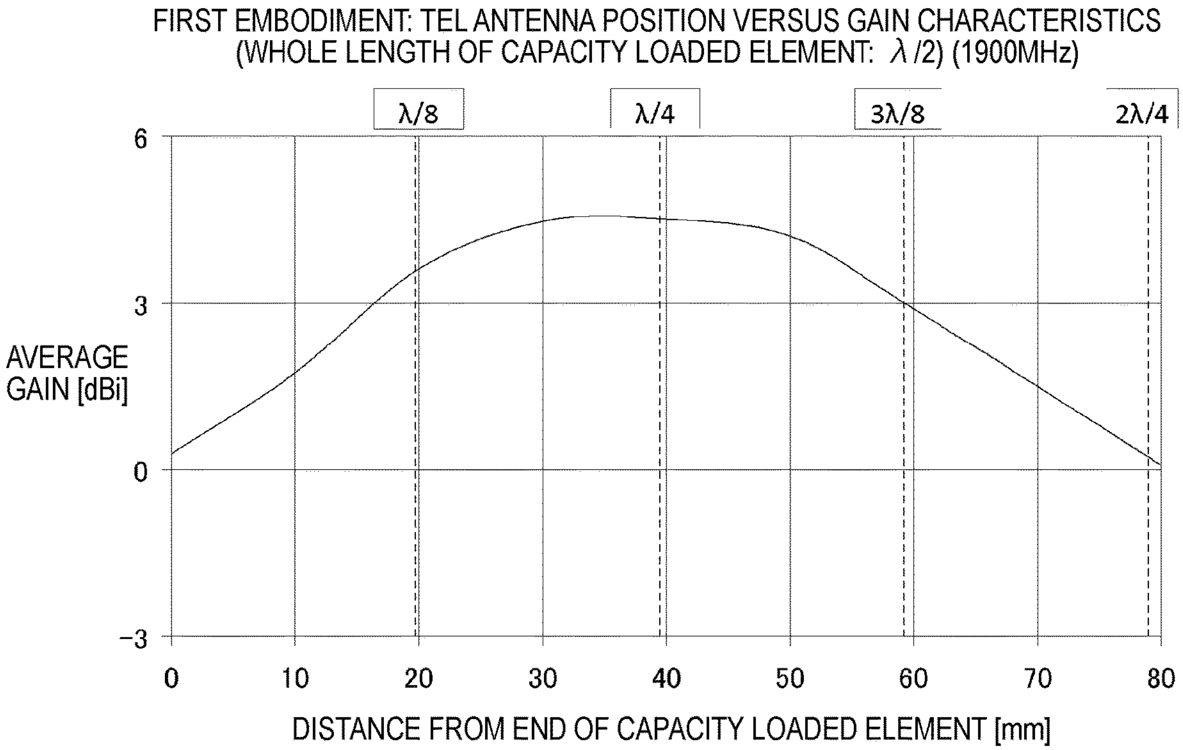
FIG. 4 is a characteristic diagram by simulation showing a relation between a distance x, in the front-rear direction, from a front end of the capacity loaded element 3 to the center position of the TEL antenna 2 in the front-rear direction and an average gain of the TEL antenna 2 at 1900 MHz in a case of setting the length L of the capacity loaded element 3 in the front-rear direction at λ/2 in the antenna device 1.

FIG. 4 is a characteristic diagram by simulation showing a relation between a distance x, in the front-rear direction, from the front end of the capacity loaded element 3 to the center position of the TEL antenna 2 in the front-rear direction and an average gain of the TEL antenna 2 at 1900 MHz in a case of setting the length L of the capacity loaded element 3 in the front-rear direction at λ/2 in the antenna device 1. In FIG. 4, λ/4 of the abscissa axis corresponds to the voltage minimum point of the capacity loaded element 3. A good antenna gain with 3 dBi or more can be obtained by setting the distance x, in the front-rear direction, from the front end of the capacity loaded element 3 to the center position of the TEL antenna 2 in the front-rear direction at $\lambda/8 \leq x \leq 3\lambda/8$ in FIG. 4.

Figure 5:
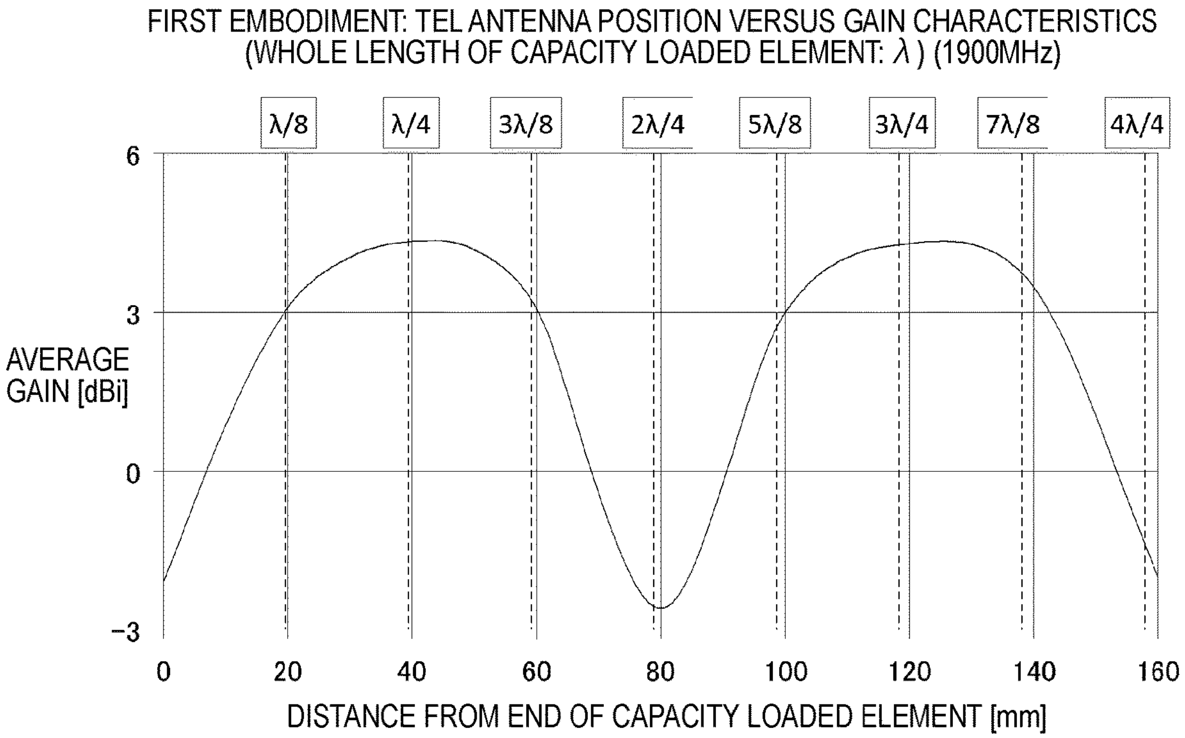
FIG. 5 is a characteristic diagram by simulation showing a relation between a distance x, in the front-rear direction, from the front end of the capacity loaded element 3 to the center position of the TEL antenna 2 in the front-rear direction and an average gain of the TEL antenna 2 at 1900 MHz in a case of setting the length L of the capacity loaded element 3 in the front-rear direction at λ in the antenna device 1.

FIG. 5 is a characteristic diagram by simulation showing a relation between a distance x, in the front-rear direction, from the front end of the capacity loaded element 3 to the center position of the TEL antenna 2 in the front-rear direction and an average gain of the TEL antenna 2 at 1900 MHz in a case of setting the length L of the capacity loaded element 3 in the front-rear direction at λ in the antenna device 1. In FIG. 5, λ/4 and 3λ/4 of the abscissa axis correspond to the voltage minimum point of the capacity loaded element 3. A good antenna gain with about 3 dBi or more can be obtained by setting the distance x, in the front-rear direction, from the front end of the capacity loaded element 3 to the center position of the TEL antenna 2 in the front-rear direction at $\lambda/8 \le x \le 3\lambda/8$ or $5\lambda/8 \le x \le 7\lambda/8$ in FIG. 5.

According to the present embodiment, since the TEL antenna 2 is located below the capacity loaded element 3, the antenna device 1 can be downsized as compared with the case (a first comparative example described below) where the TEL antenna 2 avoids a downward portion of the capacity loaded element 3 and is separated from the downward portion of the capacity loaded element 3 in the front-rear direction. Also, the center position of the TEL antenna 2 in the front-rear direction is separated from the vicinity of the voltage maximum point of the capacity loaded element 3 in the front-rear direction. This can suppress a decrease of the antenna gain. Particularly, when the center position of the TEL antenna 2 in the front-rear direction is located in the vicinity (for example, the range from the voltage minimum point to λ/8) of the voltage minimum point of the capacity loaded element 3, the antenna gain substantially similar to that in the case of the TEL antenna 2 alone can be obtained.

Second Embodiment

Figure 6:
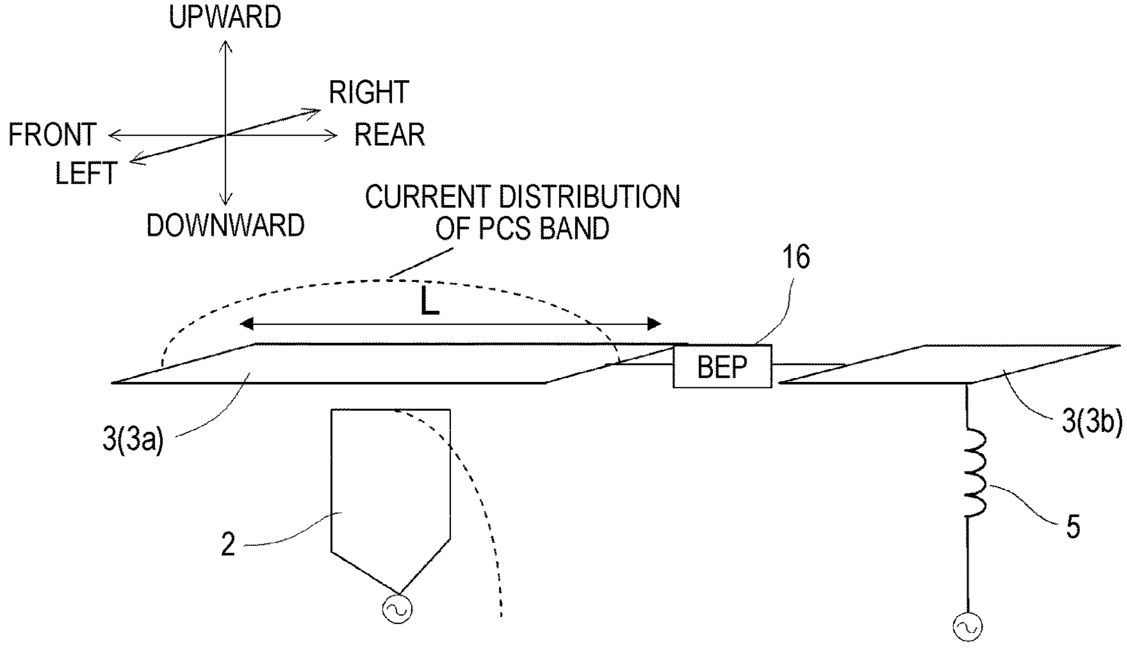
FIG. 6 is a schematic diagram of an antenna device LA according to a second embodiment of the present invention.

A second embodiment of the present invention will be described with reference to FIGS. 6 to 17, FIG. 19 and FIG. 20. FIG. 6 is a schematic diagram of an antenna device 1A according to the second embodiment of the present invention. A configuration of the antenna device 1A shown in FIG. 6 differs from that shown in FIG. 1 in that a capacity loaded element 3 includes a second plate-shaped part 3*b* and in that the second plate-shaped part 3*b* is mutually connected to a first plate-shaped part 3*a* (corresponding to the whole capacity loaded element 3 of FIG. 1) through a filter 16, but the configuration of the antenna device 1A is the same as that shown in FIG. 1 in the others. A relative position relation between a TEL antenna 2 and the first plate-shaped part 3*a* shown in FIG. 6 is the same as a relative position relation between the TEL antenna 2 and the capacity loaded element 3 in FIG. 1. The second plate-shaped part 3*b* is located in the rear of the first plate-shaped part 3*a*. The filter 16 is a band elimination filter (BEF). In the present embodiment, the filter 16 is the BEF for blocking a frequency band near to a sending and receiving frequency band of the TEL antenna 2. In the present embodiment, since the second plate-shaped part 3*b* is provided, the whole size of the capacity loaded element 3 can be increased to enhance performance in AM/FM bands.

Figure 7:
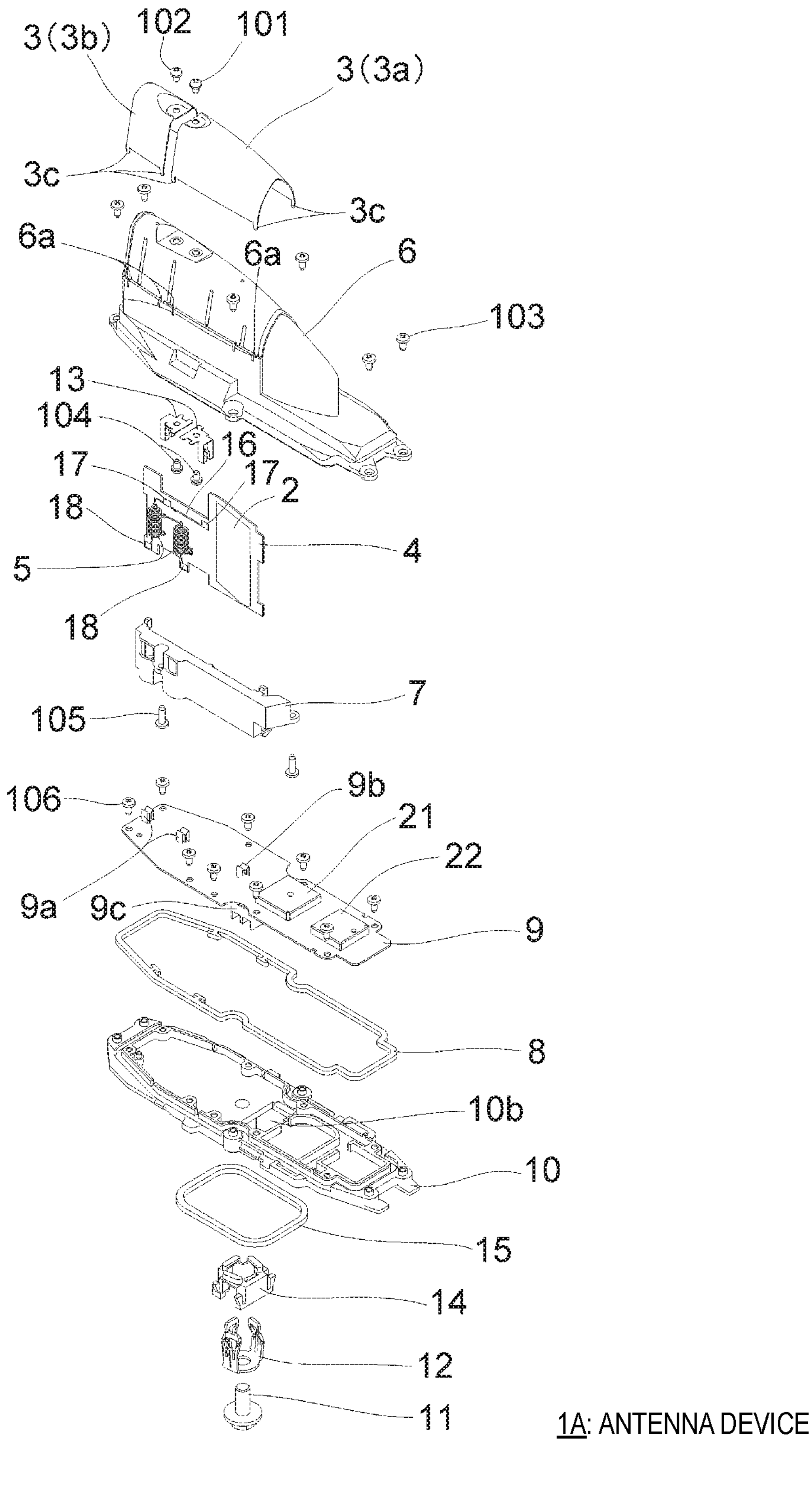
FIG. 7 is an exploded perspective view of the antenna device 1A.
Figure 13:
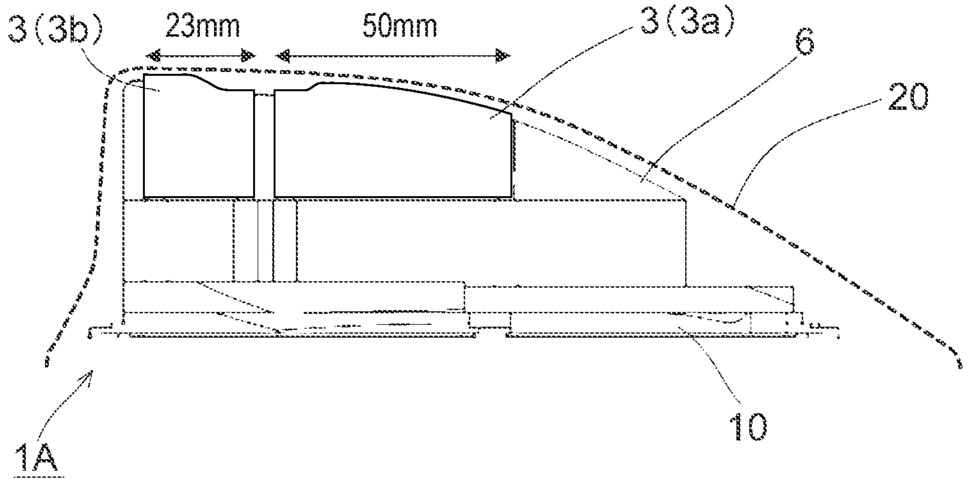
FIG. 13 is a right side view of the antenna device 1A.
Figure 14:
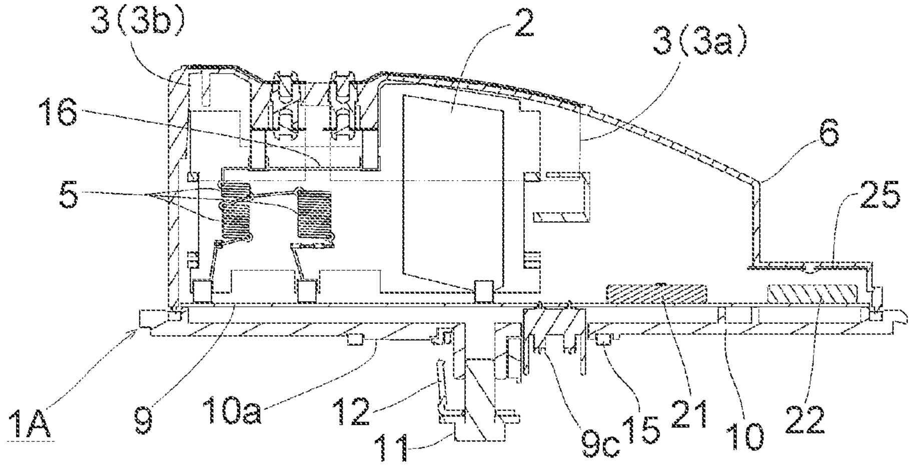
FIG. 14 is a right sectional view of the antenna device 1A.

FIG. 7 is an exploded perspective view of the antenna device 1A. FIG. 13 is a right side view of the antenna device 1A. FIG. 14 is a right sectional view of the antenna device 1A. FIGS. 7 and 14 omit illustration of an outer case 20 shown in FIG. 13. The first plate-shaped part 3*a* and the second plate-shaped part 3*b* of the capacity loaded element 3 are respectively attached (screwed) to an upward portion of an inner case 6 by screws 101, 102.

The capacity loaded element 3 is made of SUS (stainless steel) from the standpoint of rust prevention, but the capacity loaded element 3 may be a conductor which is pinched between insulating films and stuck on the inner case 6. The capacity loaded element 3 may be formed by being printed on a flexible substrate as a conductive pattern. The capacity loaded element 3 may be formed by evaporating metal powder on the inner case 6. The capacity loaded element 3 is formed in a cross section with upwardly projected shape, and is arranged in substantially parallel with an upward portion of a base 10 described below using a longitudinal direction as a front-rear direction.

Figure 8:
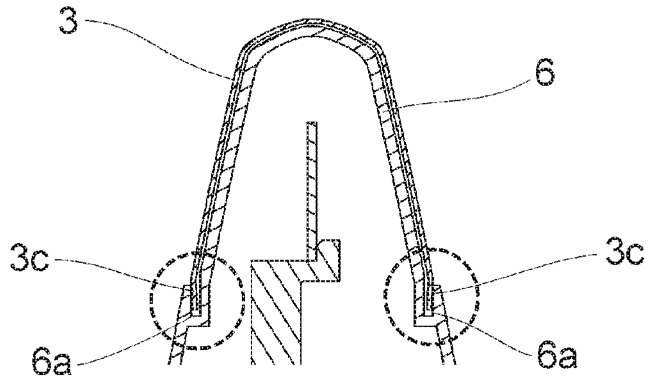
FIG. 8 is an enlarged front sectional view showing a periphery of a fitting part of a tongue piece part 3*c* of a capacity loaded element 3 and a groove part 6*a* of an inner case 6 in FIG. 7.

In order to prevent the capacity loaded element 3 from expanding in a right-left direction from the inner case 6, the capacity loaded element 3 has a plurality (respectively four in the left and right) of tongue piece parts 3*c* in a direction substantially vertical to a downward portion. As shown in FIG. 8, the capacity loaded element 3 is held in the inner case 6 by pinching each of the tongue piece parts 3*c* in a groove part 6*a* formed in the inner case 6. By forming the tongue piece parts 3*c* in the direction substantially vertical to the downward portion of the capacity loaded element 3, a surface opposed to a ground can be decreased as compared with a shape of forming the tongue piece parts in the right-left direction. This can decrease a floating capacity to prevent a decrease in a gain of an AM/FM antenna.

Figure 9:
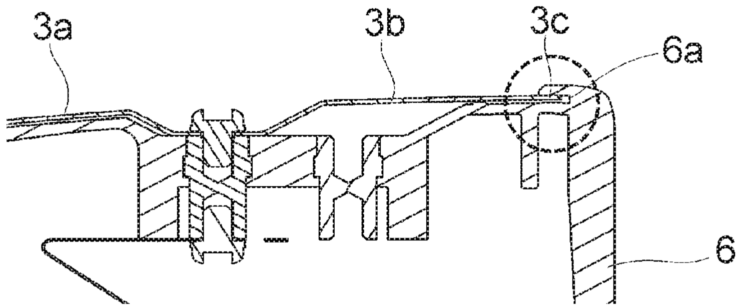
FIG. 9 is an enlarged side sectional view showing the periphery of the fitting part in the case of providing a rear end of the capacity loaded element 3 with the tongue piece part 3*c* and fitting the tongue piece part 3*c* into the groove part 6*a* of the inner case 6.
Figure 10:
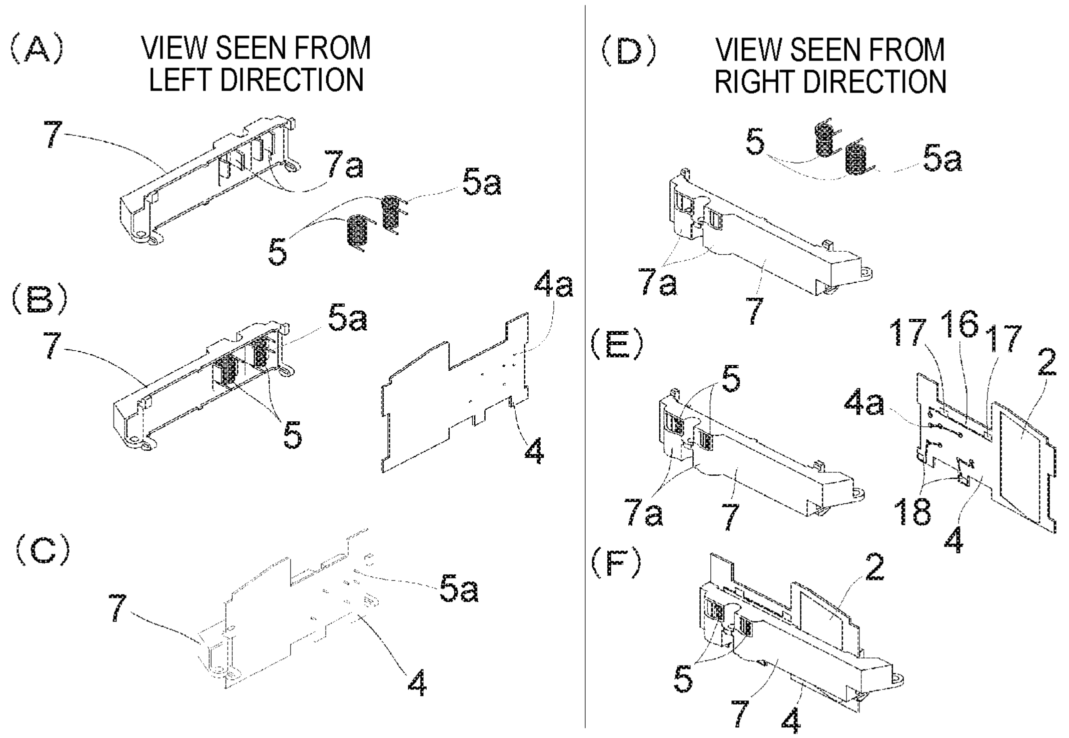
FIGS. 10(A) to 10(F) are perspective views showing an assembly process of a helical element 5, a holder 7 and a TEL antenna substrate 4.
Figure 11:
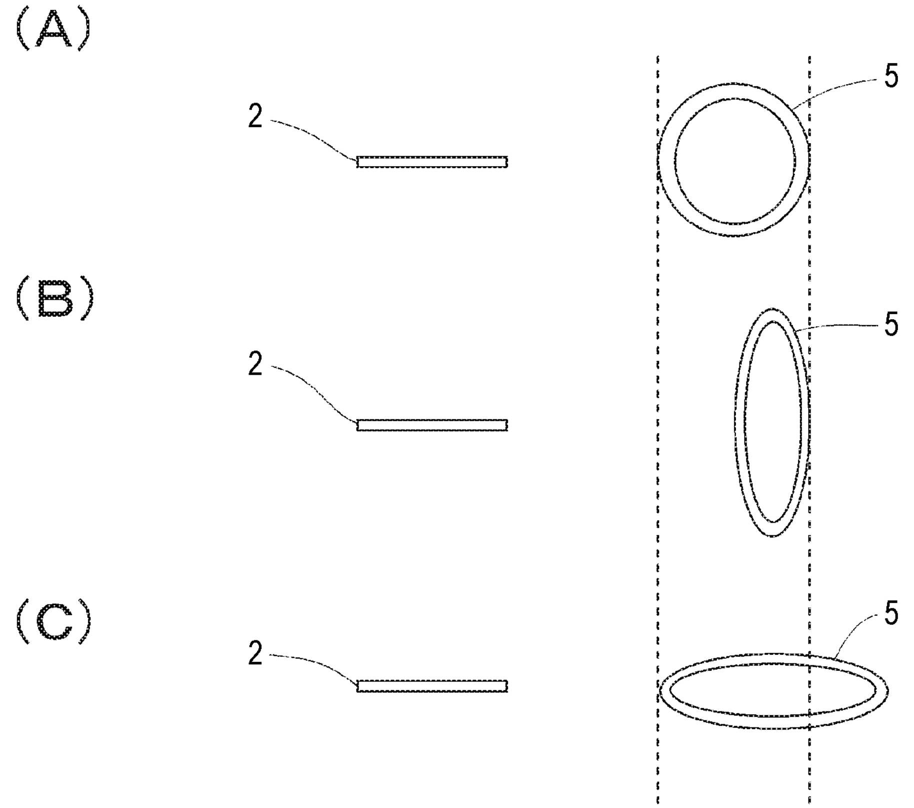
FIGS. 11(A) to 11(C) are schematic plan diagrams showing relative position relations between the TEL antenna 2 and the helical element 5 in each of the cases of forming winding shapes of the helical element 5 in a circle, an ellipse long in the right-left direction and an ellipse long in the front-rear direction.

As shown in FIG. 9, the capacity loaded element 3 may have a structure that the tongue piece part 3*c* is provided in the end of the upward rear and pinched in the groove part 6*a* of the inner case 6 formed in a position corresponding to the tongue piece part 3*c*. Also, although it is not shown in drawings, the capacity loaded element 3 may have a structure that the tongue piece part 3*c* is provided in the end of the upward front of the capacity loaded element 3 and is pinched in the groove part 6*a* of the inner case 6 similarly. When the tongue piece part 3*c* is provided in the end of the upward front or the upward rear of the capacity loaded element 3, the capacity loaded element 3 has a structure that the upward portion of the capacity loaded element 3 is extended in the front-rear direction by the length of the tongue piece part 3*c*. Accordingly, an effect as capacity loading can further be obtained without increasing a size of the inner case 6, and the gain of the AM/FM antenna can be improved.

The capacity loaded element 3 may be attached to the inner case 6 by welding, adhesion, etc. In the capacity loaded element 3, one of the first plate-shaped part 3*a* and the second plate-shaped part 3*b* may be screwed in the upward portion of the inner case 6, and the other may be held in the inner case 6 by integral molding etc. without screwing. Both of the first plate-shaped part 3*a* and the second plate-shaped part 3*b* may be held in the inner case 6 by integral molding etc. without screwing.

The inner case 6 is made of a synthetic resin with radio wave transmittivity (a molded product made of a resin such as an ABS resin). The inner case 6 is attached to the base 10 by six screws 103. As shown in FIG. 13, the inner case 6 is covered with the outer case 20. That is, the antenna device 1A includes the TEL antenna 2 and the capacity loaded element 3 in the common outer case 20.

The TEL antenna 2 is a conductor pattern formed on a TEL antenna substrate 4, and can send and receive the AMPS band and the PCS band. The TEL antenna substrate 4 is erected on an amplifier substrate 9 so as to be substantially perpendicular to the base 10 and be substantially parallel to a longitudinal direction of the capacity loaded element 3. That is, the TEL antenna 2 is substantially perpendicular to the base 10. To the TEL antenna substrate 4, a helical element 5, the filter 16 and terminal parts 17, 18 are provided. A pair of connecting plates 13 is respectively attached to the inner case 6 by screws 104. The pair of connecting plates 13 electrically connect a pair of terminal parts 17 and the first plate-shaped part 3*a* and the second plate-shaped part 3*b* of the capacity loaded element 3 with each other. A pair of terminal parts 18 are pinched between a pair of conductor plate springs (terminals) 9*a* provided on the amplifier substrate 9, and the pair of terminal parts 18 are electrically connected to the pair of conductor plate springs 9*a*. The lower end of the TEL antenna 2 is pinched between conductor plate springs 9*b* of the amplifier substrate 9, and the lower end of the TEL antenna 2 is electrically connected to the conductor plate springs 9*b*. A holder 7 is attached to the inner case 6 by two screws 105 while holding the TEL antenna substrate 4. The TEL antenna 2 is located in substantially the center of the antenna device 1A in the right-left direction, and interference with the capacity loaded element 3 is suppressed and AM/FM performance can be improved and further, an upward portion of the outer case 20 can be thinned to improve a design property. The helical element 5 is offset (shifted) in the right direction in FIG. 7, and a winding axis (center axis) of the helical element 5 is substantially parallel in an upward-downward direction and is substantially perpendicular to the right-left direction.

The amplifier substrate 9 is attached to the base 10 by nine screws 106. The amplifier substrate 9 is provided with the conductor plate springs 9*a*, 9*b*, a GPS (Global Positioning System) antenna 21, an XM (satellite radio broadcasting) antenna 22, amplifiers for AM/FM/XM/GPS signals and a TEL matching circuit (not shown). A waterproof pad (watertight sealing material) 8 is an annular elastic member such as elastomer or rubber, and is provided on the base 10. The waterproof pad 8 is pressed over the whole periphery by the lower end of the inner case 6 fixed to the base 10 by screwing etc., and the waterproof pad 8 watertightly seals a gap between the base 10 and the inner case 6. A seal member 15 is an annular elastic member such as elastomer, urethane or rubber. The seal member 15 is pinched between a lower surface of the base 10 and a vehicle body (for example, a vehicle roof) to which the antenna device 1A is attached. The seal member 15 watertightly seals a gap between the base 10 and the vehicle body. A bolt (screw for vehicle body attachment) 11 is screwed into the base 10 through a washer 12 and a holder 14, and fixes the antenna device 1A to the vehicle roof etc.

A connector 9*c* provided on a lower surface of the amplifier substrate 9 is directly projected from a connector hole 10*b* (FIG. 7) of the base 10. By projecting the connector 9*c* from the connector hole 10*b* of the base 10, various cables are not required to be prepared according to shapes of the vehicle, and cost can be reduced.

The base 10 has a structure having a step in the downward direction in the vicinity (the vicinity of the center of the base 10 in the right-left direction in the present embodiment) of a capture part (washer 12) for establishing a ground to the vehicle, of the base 10. Specifically, as shown in FIG. 14, a lower surface of the base 10 is formed in a projection 10*a* in which an inside of the seal member 15 is projected downwardly than an outside. By this structure, in the vicinity of the capture part of the base 10, a gap between the base 10 and the vehicle can be decreased to increase capacity coupling. This can suppress a generation of an unnecessary resonance resulting from the size of the base 10 (decrease the amplitude of an unnecessary resonance frequency) to suppress a decrease of a gain of the TEL antenna 2. Moreover, in a high frequency band, the gap between the base 10 and the vehicle is small in the vicinity of the capture part of the base 10. As a result, when a ground between the capture part and the vehicle is establish, a path length of the capture part can be disregarded, and the decrease of the gain of the TEL antenna 2 can be further suppressed. By the structure in which the lower surface of the base 10 is formed in the projection 10*a*, except the vicinity of the capture part, the gap between the base 10 and the vehicle can be increased so as to decrease capacity coupling between the base 10 and the vehicle. This can cope with vehicle roofs having various curvatures. This reason will hereinafter be described. In the case that the curvature of the vehicle roof varies, except the vicinity of the capture part, an amount of change in the gap between the vehicle roof and the base 10 becomes large, and an amount of change in the capacity coupling becomes large in accordance with a distance, on the base 10, from a fastening base point of the base 10. When the gap between the base 10 and the vehicle is decreased even in areas other than the vicinity of the capture part similar to the vicinity of the capture part, the capacity coupling becomes large, and the amount of change in the capacity coupling becomes large. As a result, an amount of variation in a generation frequency of an unnecessary resonance becomes large, and an adverse effect may be exerted on a desired frequency band. By the structure of the projection 10*a*, except the vicinity of the capture part, the gap between the base 10 and the vehicle is large. As a result, the capacity coupling becomes small, and even when the amount of change in the capacity coupling is large, the amount of variation in the generation frequency of the unnecessary resonance does not become too large. This can cope with the vehicle roofs having various curvatures. The projection 10*a* may extend to an outside of the seal member 15. A configuration in which the unnecessary resonance is not generated within a band of 700 MHZ to 960 MHz is desirable.

The reasons why the XM antenna 22, the GPS antenna 21, the TEL antenna 2 and the helical element 5 (a part of the AM/FM antenna) are arranged in the order from the front side to the rear side in the antenna device 1A will be described. In the frequency bands of the antennas, the XM antenna 22 has a band of 2.3 GHz, and the GPS antenna 21 has a band of 1.5 GHz, and the TEL antenna 2 has a band of 700 MHz to 900 MHz, a band of 1.7 GHz to 2.1 GHz, and a band of 2.5 GHz to 2.6 GHz, and the helical element 5 has a band of 522 kHz to 1710 kHz (for AM), and a band of 76 MHz to 108 MHz (for FM).

1. Since the frequency bands of the GPS antenna 21 and the XM antenna 22 are near to the frequency band of the TEL antenna 2, it is necessary to increase a distance between the GPS antenna 21 and the XM antenna 22, and the TEL antenna 2 in order to provide mutual isolation. As a result, by arranging the connector 9*c* between an arrangement space of the GPS antenna 21 and the XM antenna 22 and an arrangement space of the TEL antenna 2, the mutual isolation can be maintained, and the arrangement space can be decreased. The reason why the XM antenna 22 is arranged in the front side of the GPS antenna 21 is because an interference between the antennas arranged closely to each other is suppressed by arranging the antennas with higher frequencies in the order from the front side. For example, when the XM antenna 22 with a frequency higher than that of the GPS antenna 21 is arranged near to the TEL antenna 2, since a wavelength of the XM antenna 22 is shorter than that of the GPS antenna 21, the size of the TEL antenna 2 cannot be disregarded, and interference becomes larger than the case where the GPS antenna 21 is arranged near the TEL antenna 2.

2. For fixing the antenna device 1A, the bolt 11 is screwed into the base 10 in the vicinity of the center of the antenna device 1A in the front-rear direction and the right-left direction, so as not to increase a gap between the antenna device 1A and the vehicle roof. A claw tip of the washer (capture part) 12 establishes an electrical ground to the vehicle. The TEL antenna 2 is connected to a vehicle device via the connector 9*c* directly projecting from a hole of the base 10 near the bolt 11 and also via a cable (not shown). When a distance between the TEL antenna 2 and the bolt 11 is increased, a path between the TEL antenna 2 and the bolt 11 has an electrical length. Thus, a current generated in the base 10 and a current generated in the vehicle roof are mutually canceled (a current which should be excited in the TEL antenna 2 flows to the vehicle), and a gain of the TEL antenna 2 may be decreased. Accordingly, a power feeding position of the TEL antenna 2 is desirably located in the vicinity of the center of the antenna device LA in the front-rear direction and the right-left direction.

3. In consideration of aerodynamics of the vehicle to which the antenna device 1A is attached, a height of the antenna device 1A in the upward-downward direction desirably becomes large from a front side to a rear side. Accordingly, the XM antenna 22 and the GPS antenna 21 with low heights in the upward-downward direction are desirably located in the front side. The reason why the heights of the XM antenna 22 and the GPS antenna 21 in the upward-downward direction are low is because they can be downsized since desired frequencies are high and wavelengths are short.

For the three reasons described above, the XM antenna 22, the GPS antenna 21, the TEL antenna 2 and the helical element 5 are arranged in the order from the front side.

FIGS. 11(A) to 11(C) are schematic plan diagrams showing relative position relations between the TEL antenna 2 and the helical element 5 in each of the cases of forming winding shapes of the helical element 5 in a circle, in an ellipse long in the right-left direction, and in an ellipse long in the front-rear direction. The helical element 5 is wound helically and in substantially a perfect circle shape (FIG. 11(A)) in the example of FIG. 7 when viewed from the upward-downward direction (winding axis direction), but may be wound elliptically as shown in FIGS. 11(B) and 11(C). The elliptically winding has two effects.

1. When a distance between the TEL antenna 2 and the helical element 5 is short, a floating capacity may occur in both of the TEL antenna 2 and the helical element 5. In order to prevent the occurring of the floating capacity, it is desirable to increase the distance between the TEL antenna 2 and the helical element 5. However, it is difficult to increase the distance inside the small inner case 6. Hence, by winding the helical element 5 in the ellipse shape long in the right-left direction as shown in FIG. 11(B), the distance between the TEL antenna 2 and the helical element 5 becomes long, and an isolation can be improved to suppress an occurrence of the floating capacity between both of the TEL antenna 2 and the helical element 5. When the helical element 5 is wound in the ellipse shape long in the front-rear direction as shown in FIG. 11(C), a surface opposed to the TEL antenna 2 in the helical element becomes small. As a result, even when a separation distance between the TEL antenna 2 and the helical element 5 is equal to a separation distance between the TEL antenna 2 and the helical element 5 shown in FIG. 11(A), isolation between both of the TEL antenna 2 and the helical element 5 can be improved to suppress the occurrence of the floating capacity between both of the TEL antenna 2 and the helical element 5.

2. When a short diameter of the ellipse is equal to a diameter of the perfect circle, by winding the helical element 5 in the ellipse shape, a projected area of the ellipse shape in the case of viewing the helical element 5 from the upward direction becomes larger than that of the perfect circle shape, and an electrical length can be longer than the perfect circle shape. Accordingly, flexibility in arrangement in the front-rear direction inside the inner case 6 is improved. Also, since the projected area of the ellipse shape in the case of viewing the helical element 5 from the upward direction becomes large, high-frequency loss can be suppressed.

The above is the effects of the case of winding the helical element 5 in the ellipse shape. In addition, the winding shapes of the helical element 5 may be polygonal shapes such as a rectangle.

The helical element 5 is offset (shifted) in the right direction from the center of the antenna device 1A in the right-left direction in the example of FIG. 7, but may be located in the center of the right-left direction. The winding axis (center axis) of the helical element 5 may be obliquely inclined to the front-rear direction (the winding axis of the helical element 5 is not substantially parallel to the upward-downward direction). Accordingly, the distance between the helical element 5 and the TEL antenna 2 can be increased, and an electrical length of the helical element 5 can be increased. The winding axis (center axis) of the helical element 5 may be obliquely inclined to the right-left direction (the winding axis of the helical element 5 is not substantially perpendicular to the right-left direction). This effect is similar to that in the case of being obliquely inclined to the front-rear direction. The helical element 5 is structured so that the helical element 5 does not overlap with components on the amplifier substrate 9 and the capacity loaded element 3 in the upward-downward direction. Accordingly, the occurrence of the floating capacity between the helical element 5 and the capacity loaded element 3, or between the components on the amplifier substrate 9 and the helical element 5 can be suppressed.

FIGS. 10(A) to 10(F) are exploded perspective views of the helical element 5, the holder 7 and the TEL antenna substrate 4. The helical element 5 is held in the holder 7 from the outside. Specifically, the holder 7 has a helical element holding part 7*a* for storing the helical element 5. The helical element holding part 7*a* holds the helical element 5 from the outside. Pull-out parts 5*a* of the helical element 5 are respectively inserted into helical element connecting holes 4*a* of the TEL antenna substrate 4. Since a high-frequency current flows through more an inner peripheral side than an outer peripheral side of the helical element 5, high-frequency loss unlikely occurs in the case of holding the helical element 5 in the holder 7 from the outside than the case of holding the helical element 5 in the holder 7 from the inside. By holding the helical element in the helical element holding part 7*a* from the outside, a maximum outside diameter of the helical element 5 does not become larger than an inside diameter of the holder 7, and variations in the electrical length of the helical element 5 can be suppressed. A groove (not shown) is formed in an inner surface of the helical element holding part 7*a* of the holder 7, and the helical element 5 may be arranged so as to be stored in the groove. In this case, there are effects that variations in the electrical length of the helical element 5 can be suppressed and a distance between conductors of the helical element 5 can be maintained. In addition, the helical element 5 may be held in the holder 7 from the inside. That is, the helical element 5 may have a shape wound on the holder 7. Further, a groove is formed in the holder 7, and the helical element 5 may be stored in the groove. An effect thereof is similar to that in the case of being stored in the groove of the inner surface of the helical element holding part 7*a*. The holder 7 is attached to the TEL antenna substrate 4. Since the holder 7 holds the helical element 5 and is attached to the TEL antenna substrate 4, a position relation between the TEL antenna 2 and the helical element 5 is fixed, and a change in performance due to a mutual positional displacement can be prevented. Further, if there would be no adverse effect in use due to vibration etc., the holder 7 may be omitted.

A power feeding point (terminal part 18) of the helical element 5 is arranged near to the helical element 5. Accordingly, since the helical element 5 is located in the rear of the antenna device 1A, an amplifier (not shown) can be formed on the amplifier substrate 9. Further, conductor loss due to a power feeding line from the power feeding point to the helical element 5, or a floating capacity of the power feeding line can be decreased. By setting the length of the power feeding line at about 32 mm or less (one-fourth the wavelength of the XM antenna 22), a decrease of a gain of the XM antenna 22 by the length of the power feeding line can be suppressed. A position of a point of connection (terminal part 17) between the capacity loaded element 3 and the helical element 5 is near to the helical element 5. Thus, an effect similar to the above can be obtained.

As shown in FIG. 13, a dimension of the first plate-shaped part 3*a* of the capacity loaded element 3 in the front-rear direction is about 50 mm, which is an electrical length of about one-half the wavelength of the PCS band and which is the electrical length that does not resonate with the PCS band. A dimension of the second plate-shaped part 3*b* of the capacity loaded element 3 in the front-rear direction is about 23 mm, which is the electrical length that does not resonate with the PCS band. The whole length of the first plate-shaped part 3*a* and the second plate-shaped part 3*b* of the capacity loaded element 3 is about 80 mm, which is the electrical length that does not resonate with the AMPS band.

Figure 15:
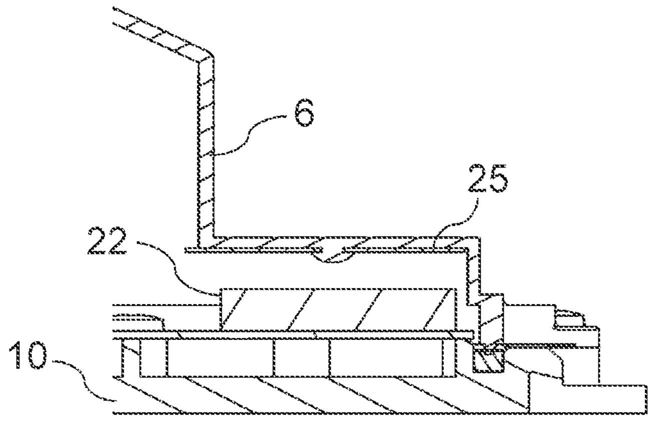
FIG. 15 is an enlarged view of the front of FIG. 14.

As shown in FIGS. 14 and 15, a parasitic element 25 covers the XM antenna 22 with space opened from above. The parasitic element 25 is attached to a lower surface of the inner case 6, for example, by welding. By covering the XM antenna 22 with the parasitic element 25, a gain of the XM antenna 22 in a vertical direction is improved. The GPS antenna 21 may be covered with the parasitic element 25.

The filter 16 is a filter that electrically divides the first plate-shaped part 3*a* and the second plate-shaped part 3*b* of the capacity loaded element 3 at a high frequency (higher than or equal to a frequency band of the TEL antenna 2) and electrically connects the first plate-shaped part 3*a* and the second plate-shaped part 3*b* at a low frequency (lower than or equal to a frequency band of AM/FM). While the filter 16 is provided between the helical element 5 and the first plate-shaped part 3*a* near the TEL antenna 2, the filter 16 is not provided between the helical element 5 and the second plate-shaped part 3*b* which is not near the TEL antenna 2. Since the first plate-shaped part 3*a* is arranged near the TEL antenna 2, a high-frequency current may flow through the helical element 5 from the first plate-shaped part 3*a* and also flow into an AM/FM amplifier, in sending on the TEL antenna 2. The filter 16 can cut off this current. Since the second plate-shaped part 3*b* is not near the TEL antenna 2, such a current is difficult to flow, and the filter 16 is not provided in order to reduce cost. If an attenuation by the filter 16 is insufficient, an additional filter may be added between the capacity loaded element 3 and the helical element 5.

Figure 12:
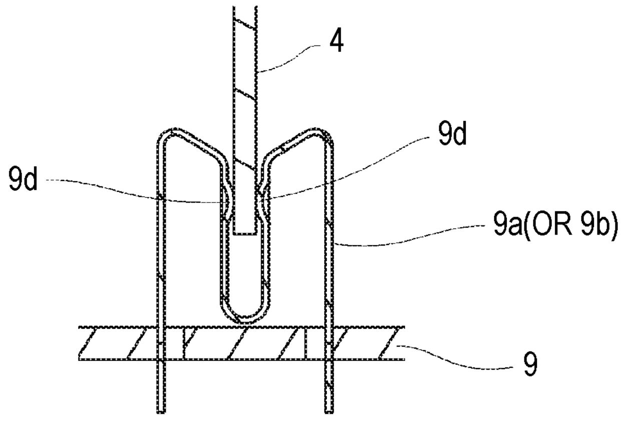
FIG. 12 is an enlarged sectional view showing a state of holding the TEL antenna substrate 4 by conductor plate springs 9*a*, 9*b*.

The TEL antenna substrate 4 is electrically connected to the amplifier substrate 9 at a power feeding point by an elasticity of the conductor plate springs 9*a*, 9*b* which are M-shaped springs (FIG. 12). When the number of power feeding points becomes large, fixing by the conductor plate springs 9*a*, 9*b* becomes unstable due to their shapes (shapes of the M-shaped springs), and a contact resistance often becomes unstable. Further, the contact resistance to the conductor plate springs 9*a*, 9*b* may vary depending on an assembly tolerance. As shown in FIG. 12, the inside of each of the conductor plate springs 9*a*, 9*b* which are the M-shaped springs are provided with mutually opposed protrusions 9*d*, and the protrusions 9*d* pinch the TEL antenna substrate 4, thereby stabilizing the contact resistance to the conductor plate springs 9*a*, 9*b*. In addition, rather than providing the protrusions on each of the conductor plate springs 9*a*, 9*b*, the protrusions may be provided on the side of the TEL antenna substrate 4. Further, the protrusions may be provided on both of each of the conductor plate springs 9*a*, 9*b* and the side of the TEL antenna substrate 4. The same applies to a point of connection between the capacity loaded element 3 and the TEL antenna substrate 4 (an interconnection between the connecting plate 13 and the TEL antenna substrate 4).

Figure 16:
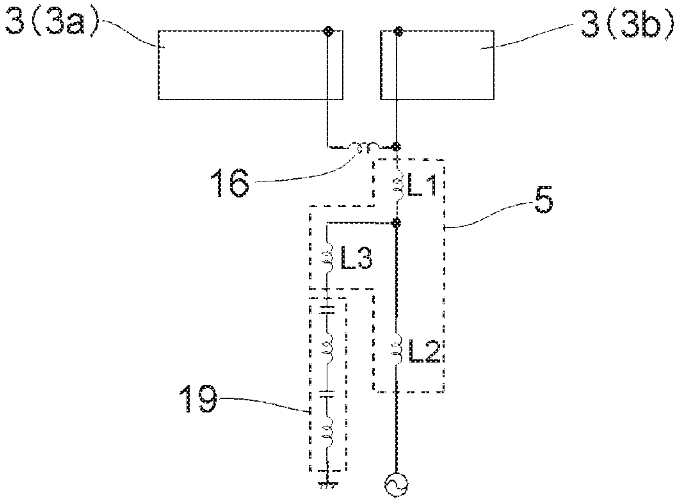
FIG. 16 is a connection circuit diagram of the antenna device 1A (the first).

FIG. 16 is a connection circuit diagram of the antenna device 1A (the first). An inverted-F antenna of a top capacity loading type is configured by the first plate-shaped part 3*a* and the second plate-shaped part 3*b* of the capacity loaded element 3, and the helical element 5. AM/FM broadcast waves received by the inverted-F antenna is transmitted to the amplifier substrate 9. One end of a helical element L1 of each of the helical elements 5 (L1 to L3) configuring the inverted-F antenna is connected to the second plate-shaped part 3*b* and also is connected to one end of the filter 16. The other end of the helical element L1 is connected to one end of each of the helical element L2, L3. The other end of the helical element L2 is connected to a power feeding point. The other end of the helical element L3 is connected to one end of a filter 19. The other end of the filter 19 is connected to a ground. A resonance frequency and an impedance of the antenna can be adjusted by defining a relation of an inductance of each of the helical elements 5 (L1 to L3) configuring the inverted-F antenna. Specifically, the impedance of the antenna can be adjusted by the inductance of the helical element 5 (L3) connected to the ground. As the inductance is increased, the impedance is decreased, and as the inductance is decreased, the impedance is increased. The resonance frequency can be adjusted by adjusting the inductances of the two helical elements 5 (L1, L2). Here, the inductances of the helical elements 5 have a relation of $L1<L2<L3$. One example of specific numerical values is L1=127 nH, L2=425 nH, and L3=929 nH. An antenna type of AM/FM may be an inverted-L and a Brown antenna which one end is short-circuited (an antenna which one end is grounded). However, by adopting the inverted-F antenna as the antenna type of AM/FM, an impedance of an FM band is increased, and variations in impedance in the case of adding the TEL antenna 2 are decreased, and the influence of the TEL antenna 2 can be decreased. The filter 19 is a band pass filter (BPF) of the FM band. In the inverted-F antenna, an AM band is not received if the antenna is connected to a ground. Accordingly, the filter 19 passing through only the FM band is loaded in order to reduce deterioration of the AM band.

Figure 17:
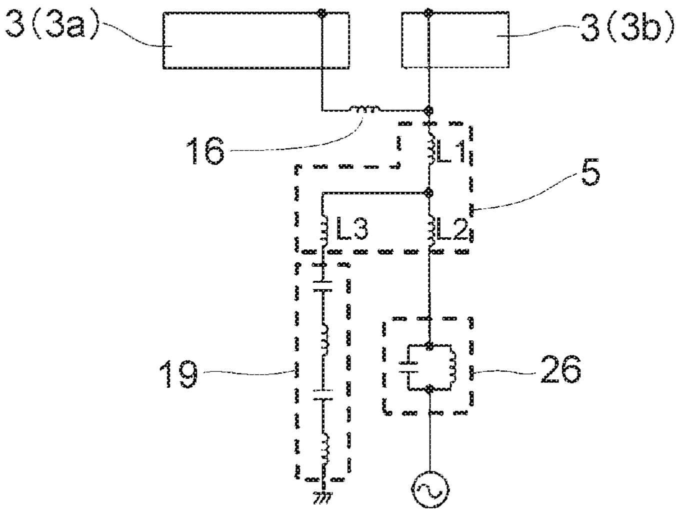
FIG. 17 is a connection circuit diagram of the antenna device 1A (the second).

FIG. 17 is a connection circuit diagram of the antenna device 1A (the second). A circuit of FIG. 17 differs from that of FIG. 16 in that a filter 26 as a second filter is provided between the helical element 5 and the amplifier substrate 9. The filter 26 is provided on the side of the TEL antenna substrate 4 rather than the side of the amplifier substrate 9. Accordingly, an impedance of the TEL band of a side of the helical element 5 beyond a power feeding point of the helical element 5 is increased, and a harmonic of FM resonance generated in the helical element 5 can be suppressed so as to suppress a decrease of a gain of the TEL antenna 2. The filter 26 may be a parallel resonance circuit of a chip inductor and a chip capacitor, or may be a chip inductor in which a self resonance frequency is a desired frequency band of the TEL antenna 2. The present function may be given to the helical element 5 itself, instead of a chip component. In addition, a configuration in which a harmonic is not generated within a band of 700 MHz to 960 MHz is desirable.

Figure 19:
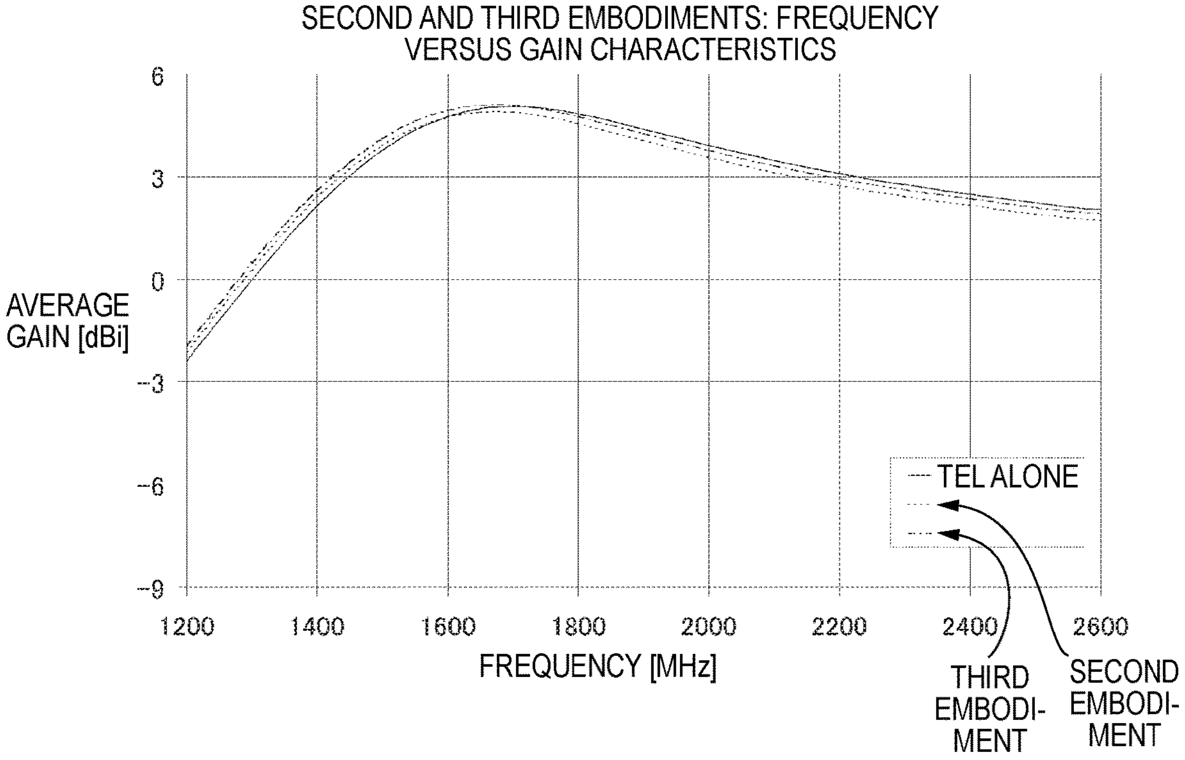
FIG. 19 is a characteristic diagram by simulation showing a relation (a broken line and a chain line) between a frequency and an average gain of the TEL antenna 2 of the antenna device 1A of the second embodiment and the antenna device 1B of the third embodiment together with a relation (a solid line) between a frequency and an average gain of the TEL antenna 2 alone (in the absence of the capacity loaded element 3).

FIG. 19 is a characteristic diagram by simulation showing a relation (a broken line and a chain line) between a frequency and an average gain of the TEL antenna 2 of the antenna device 1A of the second embodiment and an antenna device 1B of the third embodiment described below together with a relation (a solid line) between a frequency and an average gain of the TEL antenna 2 alone (in the absence of the capacity loaded element 3). In FIG. 19, an antenna gain of the TEL antenna 2 of the antenna device 1A of the present embodiment has good characteristics similar to those in the case of the TEL antenna 2 alone, similar to the antenna gain (FIG. 2) of the TEL antenna 2 of the antenna device 1 of the first embodiment.

Figure 20:
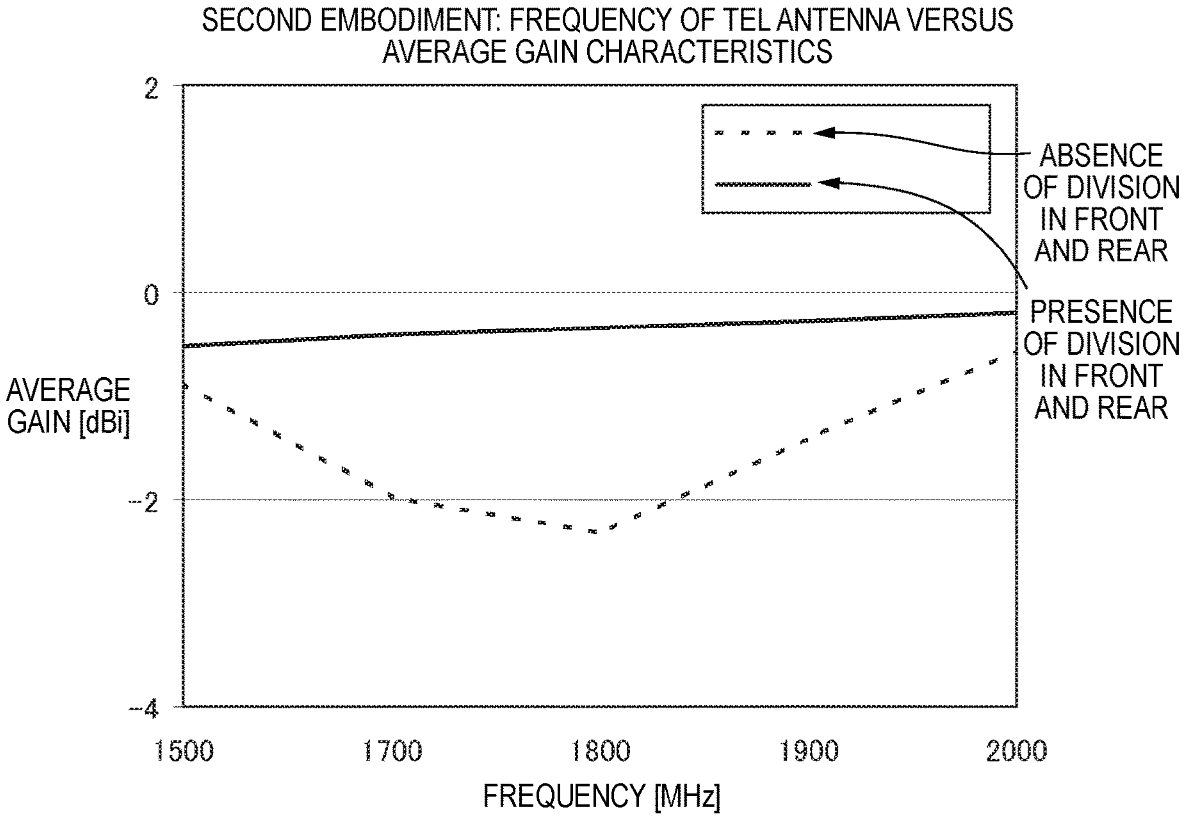
FIG. 20 is a characteristic diagram by actual measurement showing a relation between a frequency and an average gain of the TEL antenna 2 in each of a case where the capacity loaded element 3 is divided into a first plate-shaped part 3*a* and a second plate-shaped part 3*b* in a front-rear direction and a case where the capacity loaded element 3 is not divided into the first plate-shaped part 3*a* and the second plate-shaped part 3*b* in the front-rear direction.

FIG. 20 is a characteristic diagram by actual measurement showing a relation between a frequency and an average gain of the TEL antenna 2 in each of the case where the capacity loaded element 3 is divided into the first plate-shaped part 3*a* and the second plate-shaped part 3*b* in the front-rear direction and the case where the capacity loaded element 3 is not divided into the first plate-shaped part 3*a* and the second plate-shaped part 3*b* in the front-rear direction. As is evident from FIG. 20, by dividing the capacity loaded element 3 into the first plate-shaped part 3*a* and the second plate-shaped part 3*b* in the front-rear direction, an interference between the capacity loaded element 3 and the TEL antenna 2 can be suppressed, and an average gain of the TEL antenna 2 can be ensured. The interference can be further suppressed by further dividing the capacity loaded element 3 in the front-rear direction. However, efficiency of work in manufacturing becomes worse by dividing the capacity loaded element 3, and a circuit becomes complicated, thus increasing cost. Accordingly, the capacity loaded element 3 is desirably divided into the two parts in the front-rear direction, similar to the antenna device 1A.

Third Embodiment

Figure 18:
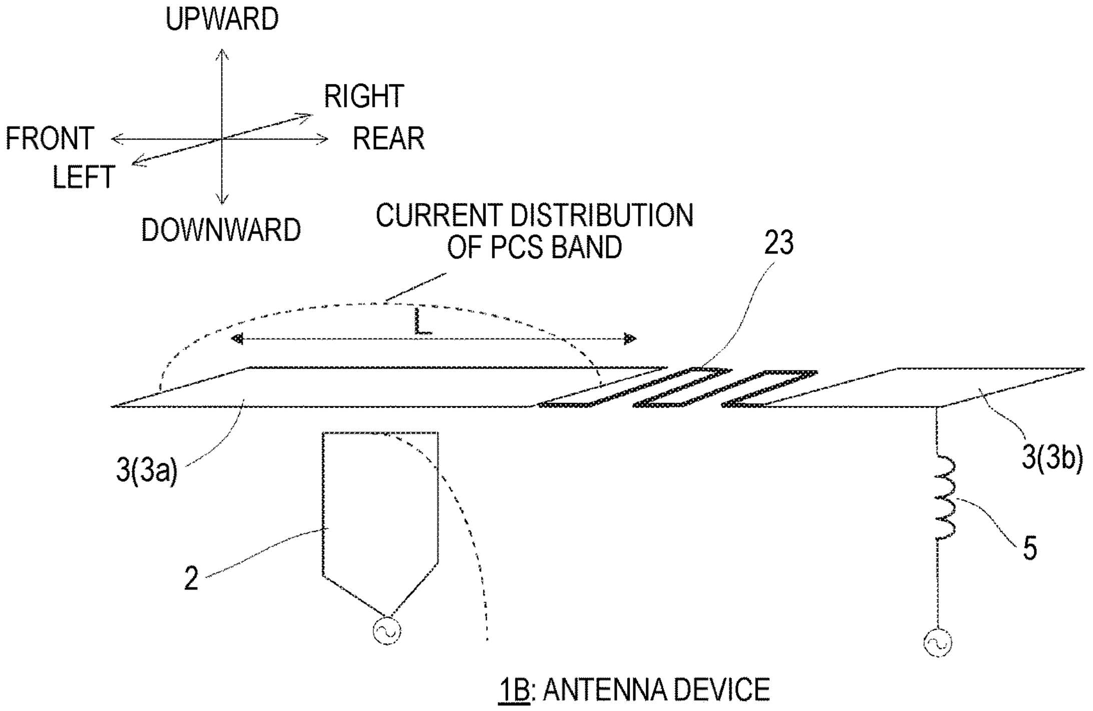
FIG. 18 is a schematic diagram of an antenna device 1B according to a third embodiment of the present invention.

FIG. 18 is a schematic diagram of an antenna device 1B according to a third embodiment of the present invention. The antenna device 1B shown in FIG. 18 includes a meander line 23 instead of the filter 16 of the antenna device 1A shown in FIG. 6. The meander line 23 connects a first plate-shaped part 3*a* and a second plate-shaped part 3*b* of a capacity loaded element 3 to each other. The other configurations of the present embodiment are similar to those of the second embodiment. As shown in FIG. 19, an antenna gain of a TEL antenna 2 of the antenna device 1B of the present embodiment has good characteristics similar to those in the case of the TEL antenna 2 alone, similar to the antenna gain of the TEL antenna 2 of the antenna device LA of the second embodiment.

First Comparative Example

Figure 21:
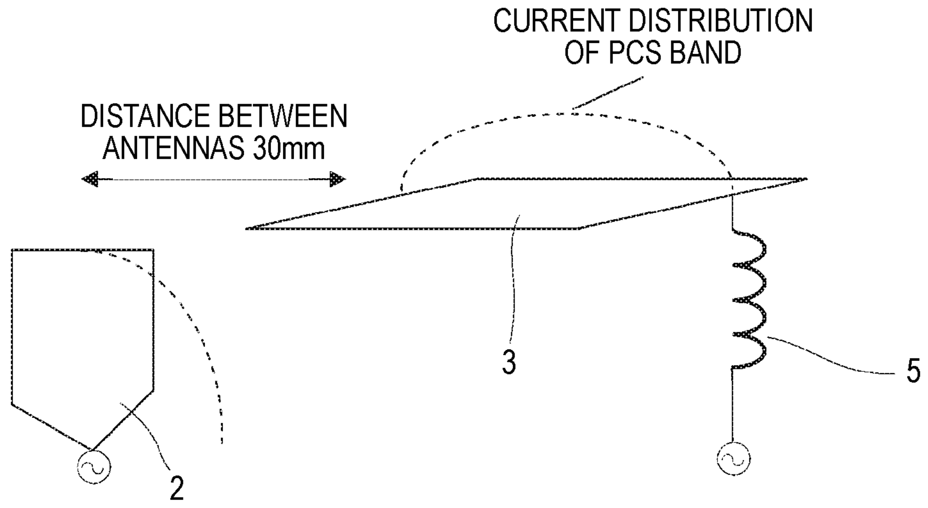
FIG. 21 is a schematic diagram of an antenna device according to a first comparative example.

FIG. 21 is a schematic diagram of an antenna device according to a first comparative example. This antenna device differs from that of the first embodiment shown in FIG. 1 in that the TEL antenna 2 is separated from the capacity loaded element 3 in the front-rear direction. Specifically, a center position of the TEL antenna 2 in the front-rear direction is separated from the front end of the capacity loaded element 3 by 30 mm, and is the same as that of the first embodiment in the others.

Figure 23:
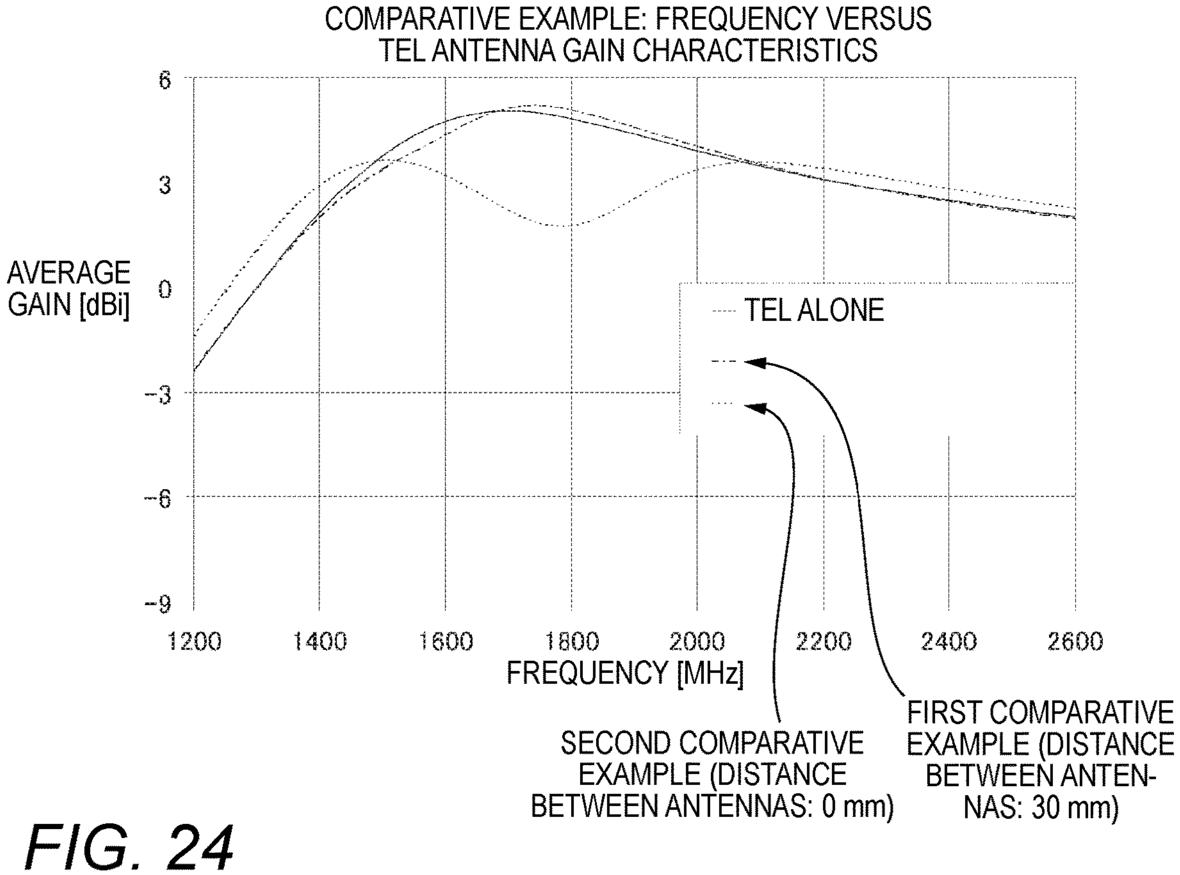
FIG. 23 is a characteristic diagram by simulation showing a relation (a broken line and a chain line) between a frequency and an average gain of a TEL antenna 2 of the antenna device of the first and second comparative examples together with a relation (a solid line) between a frequency and an average gain of the TEL antenna 2 alone (in the absence of a capacity loaded element 3).

FIG. 23 is a characteristic diagram by simulation showing a relation (a broken line and a chain line) between a frequency and an average gain of the TEL antenna 2 of the antenna device of the first comparative example and a second comparative example (described below) together with a relation (a solid line) between a frequency and an average gain of the TEL antenna 2 alone (in the absence of the capacity loaded element 3). In FIG. 23, an antenna gain of the TEL antenna 2 of the antenna device of the first comparative example has good characteristics similar to those of the TEL antenna 2 alone. However, since the TEL antenna 2 is separated from the capacity loaded element 3 in the front direction, the antenna device is upsized.

Second Comparative Example

Figure 22:
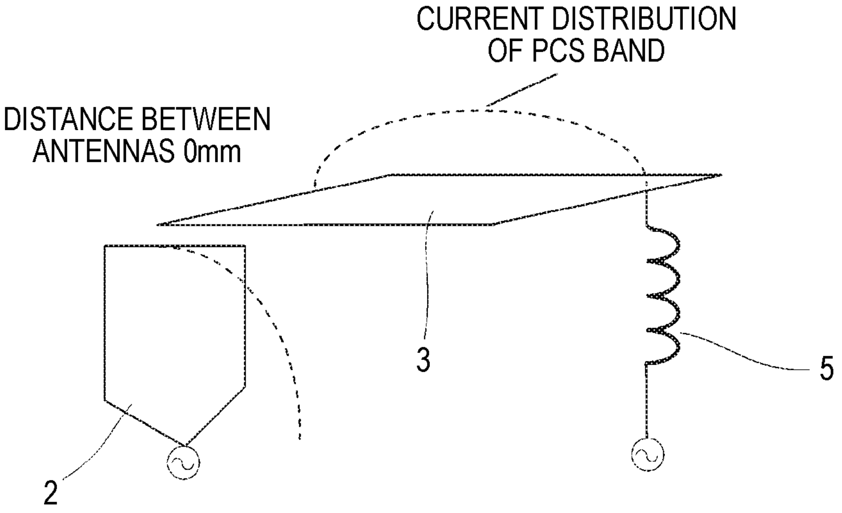
FIG. 22 is a schematic diagram of an antenna device according to a second comparative example.

FIG. 22 is a schematic diagram of an antenna device according to a second comparative example. This antenna device differs from that of the first embodiment shown in FIG. 1 in that a center position of the TEL antenna 2 in a front-rear direction coincides with the front end of a capacity loaded element 3, and is the same to that of the first embodiment in the others. In the second comparative example, a separation distance between the center position of the TEL antenna 2 in the front-rear direction and the front end of the capacity loaded element 3 in the first comparative example is set at 0 mm. For the second comparative example, since the TEL antenna 2 is near the capacity loaded element 3 in the front-rear direction, the antenna device can be downsized. However, due to the influence of the capacity loaded element 3, an antenna gain of the TEL antenna 2 becomes considerably worse than that in the case of the TEL antenna 2 alone as shown in FIG. 23.

Figure 24:
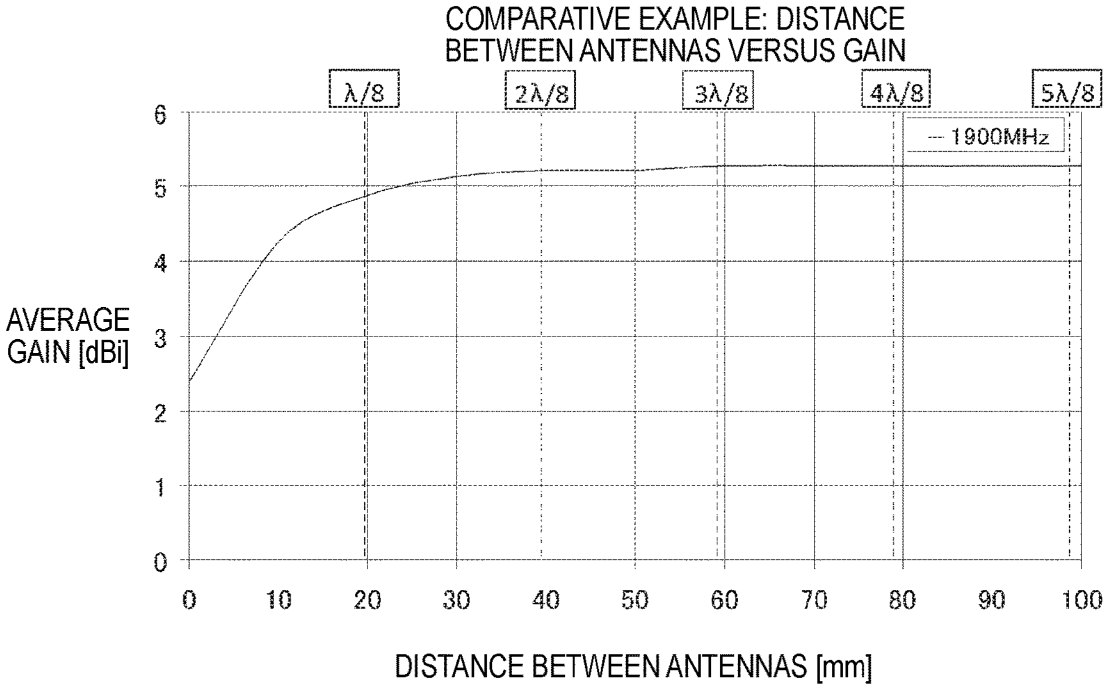
FIG. 24 is a characteristic diagram by simulation showing a relation between a separation distance (a distance between antennas) from the capacity loaded element 3 and an average gain in the TEL antenna 2 of the comparative examples.

FIG. 24 is a characteristic diagram by simulation showing a relation between a separation distance (a distance between antennas) from the capacity loaded element 3 and an average gain in the TEL antenna 2 of the comparative examples. In FIG. 24, 30 mm and 0 mm of the abscissa axis correspond to the first comparative example and the second comparative example, respectively. According to a technical idea of arranging the TEL antenna 2 so as to avoid arranging a portion of the TEL antenna 2 below the capacity loaded element 3 in order to avoid an influence of the capacity loaded element 3, it is necessary to separate the TEL antenna 2 from the capacity loaded element 3 in order to improve the antenna gain of the TEL antenna 2 in FIG. 24. On the other hand, in the first to third embodiments described above, the antenna gain of the TEL antenna 2 can be improved while arranging the TEL antenna 2 below the capacity loaded element 3. This can achieve downsizing while suppressing a decrease of the antenna gain.

Fourth Embodiment

Figure 25:
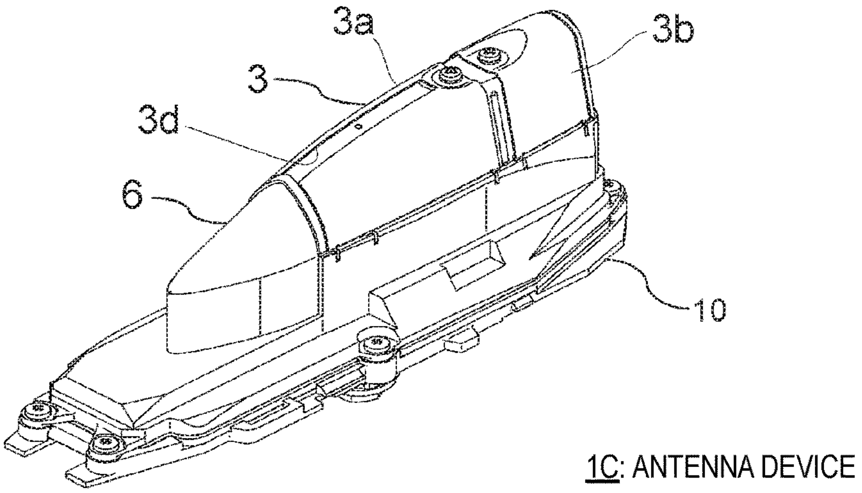
FIG. 25 is a perspective view of an antenna device 1C according to a fourth embodiment of the present invention.
Figure 26:
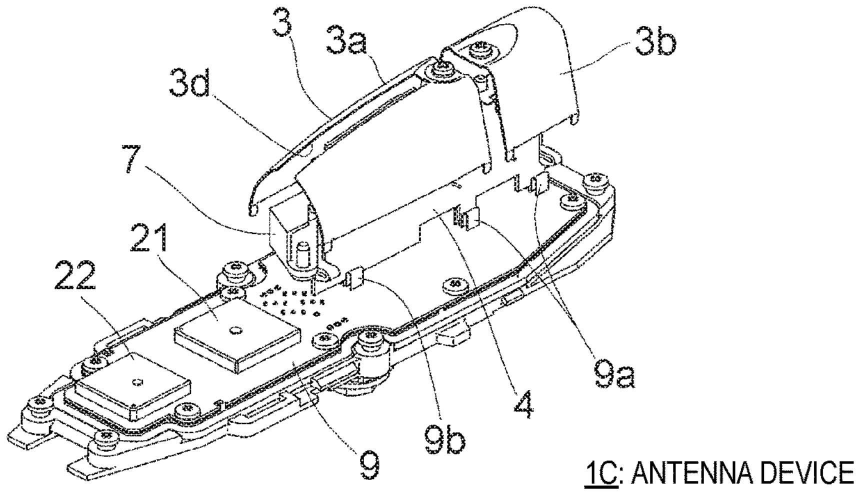
FIG. 26 is a perspective view of the antenna device 1C but an inner case 6 is omitted from the antenna device 1C in FIG. 25.

FIG. 25 is a perspective view of an antenna device 1C according to a fourth embodiment of the present invention. FIG. 26 is a perspective view of the antenna device 1C but an inner case 6 is omitted from the antenna device 1C in FIG. 25. The antenna device 1C of the present embodiment differs from the antenna device 1A of the second embodiment in that the first plate-shaped part 3*a* of a capacity loaded element 3 is provided with a cutout part 3*d*, and is the same as the antenna device 1A in the others. By having the cutout part 3*d*, the first plate-shaped part 3*a* has a shape in which one side of a rectangle is removed (C shape or U shape) when viewed from above, and is divided in a right-left direction except the rear end. Accordingly, the first plate-shaped part 3*a* has a pair of sides opposed so as to sandwich the cutout part 3*d*. Thus, high-frequency currents tend to flow through this pair of sides in directions opposite to each other. As a result, a harmonic component of a frequency higher than an FM band excited in the capacity loaded element 3 is easy to be canceled. This can shorten a distance between antennas (the capacity loaded element 3 and a TEL antenna 2) with different resonance frequencies.

Figure 27:
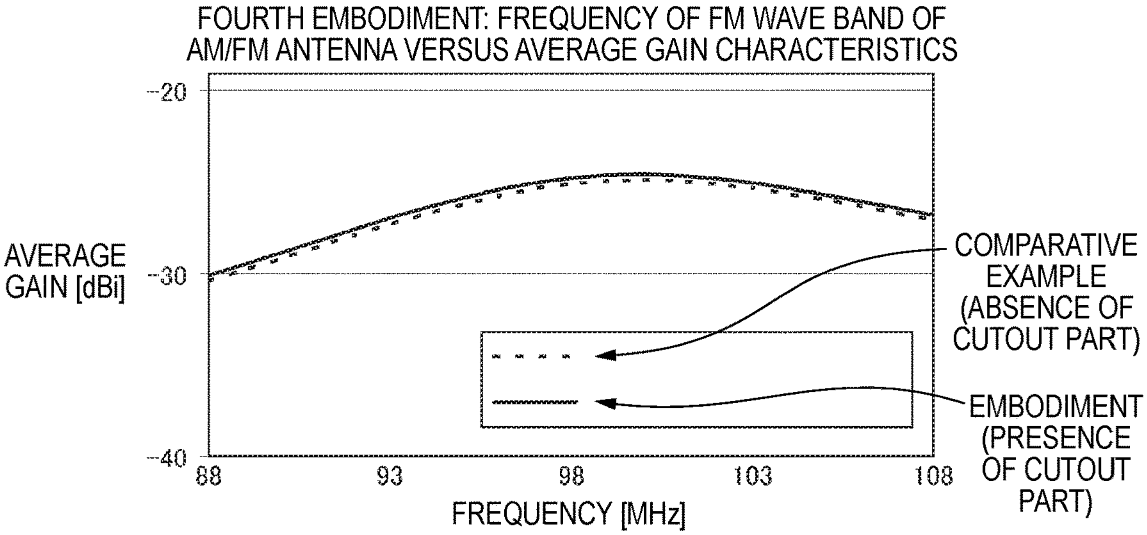
FIG. 27 is a characteristic diagram by simulation showing a relation between a frequency and an average gain of an FM wave band of an AM/FM antenna in each of the cases of capacity loaded elements 3 with a cutout part 3*d* and without the cutout part 3*d*.

FIG. 27 is a characteristic diagram by simulation showing a relation between a frequency and an average gain of an FM wave band of an AM/FM antenna in each of the cases of the capacity loaded elements 3 with the cutout part 3*d* and without the cutout part 3*d*. An average gain of the TEL antenna 2 can be improved by forming the first plate-shaped part 3*a* of the capacity loaded element 3 in the shape in which one side of the rectangle is removed (C shape or U shape) as described above in FIG. 27. This is because a floating capacity can be decreased by increasing a separation distance between the capacity loaded element 3 and the TEL antenna 2. By forming the first plate-shaped part 3*a* in the shape in which one side of the rectangle is removed (C shape or U shape), efficiency of work for attaching the first plate-shaped part 3*a* to the inner case 6 is improved as compared with the case where the first plate-shaped part 3*a* is made of two plate-shaped parts separated in the right-left direction. Further, the number of screws can be decreased to reduce cost.

Figure 28:
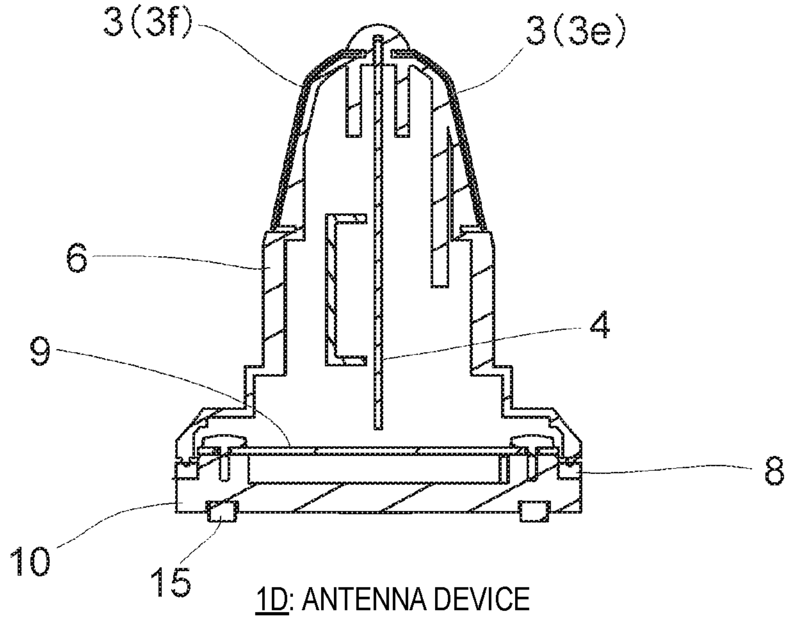
FIG. 28 is a front sectional view of an antenna device 1D according to a fifth embodiment of the present invention.
Figure 29:
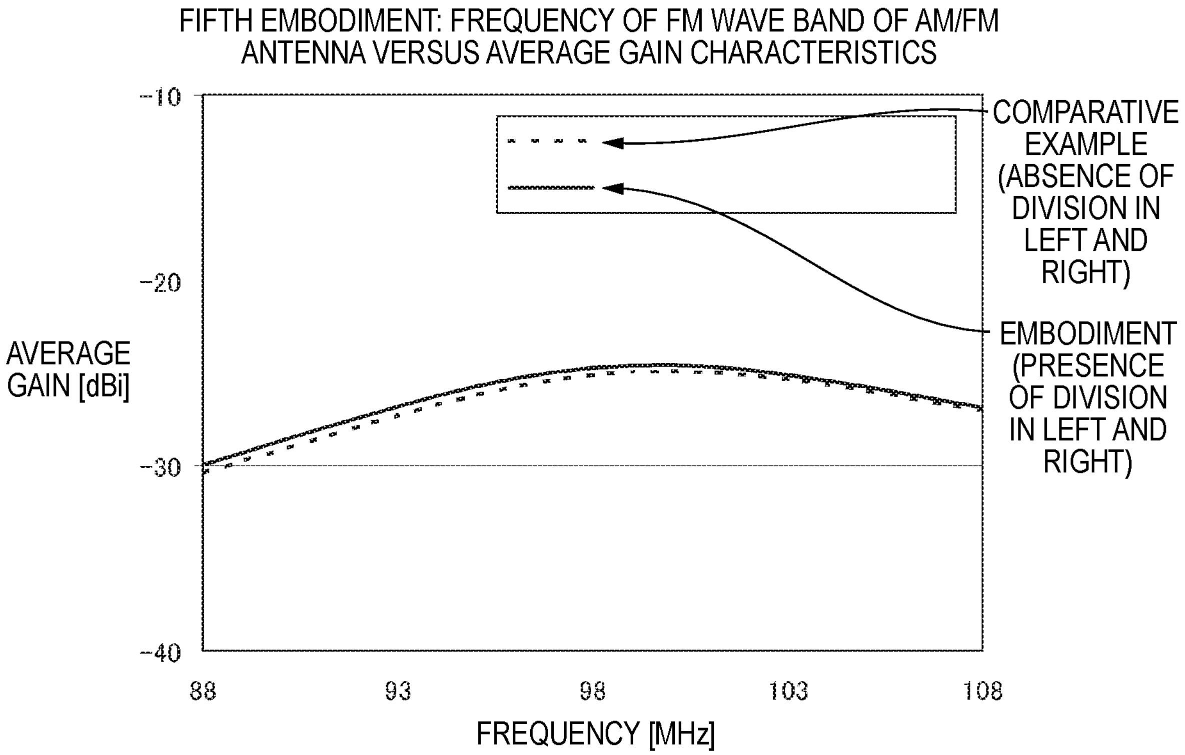
FIG. 29 is a characteristic diagram by simulation showing a relation between a frequency and an average gain of an FM wave band of an AM/FM antenna in each of a case where a capacity loaded element 3 is divided into a left plate-shaped part 3*e* and a right plate-shaped part 3*f* in a right-left direction and a case where the capacity loaded element 3 is not divided into the left plate-shaped part 3*e* and the right plate-shaped part 3*f* in the right-left direction.

FIG. 28 is a front sectional view of an antenna device 1D according to a fifth embodiment of the present invention. The antenna device 1D of the present embodiment differs from the antenna device 1A of the second embodiment in that a capacity loaded element 3 is divided into a left plate-shaped part 3*e* and a right plate-shaped part 3*f* in the right-left direction and in that the TEL antenna substrate 4 and the TEL antenna provided on the TEL antenna substrate 4 are upwardly projected from a portion between the left plate-shaped part 3*e* and the right plate-shaped part 3*f*, and is the same with the antenna device 1A in the others. By dividing the capacity loaded element 3 in the right-left direction, a floating capacity occurring between the capacity loaded element 3 and the TEL antenna 2 can be decreased to enhance performance in AM/FM bands. The TEL antenna substrate 4 and the TEL antenna provided on the TEL antenna substrate 4 are upwardly projected from the portion between the left plate-shaped part 3*e* and the right plate-shaped part 3*f* and thereby, performance of the TEL antenna can be enhanced. FIG. 29 is a characteristic diagram by simulation showing a relation between a frequency and an average gain of an FM wave band of an AM/FM antenna in each of the case where the capacity loaded element 3 is divided into the left plate-shaped part 3*e* and the right plate-shaped part 3*f* in the right-left direction and the case where the capacity loaded element 3 is not divided into the left plate-shaped part 3*e* and the right plate-shaped part 3*f* in the right-left direction. In addition, in the case of being divided in the right-left direction in FIG. 29, the TEL antenna is not upwardly projected from the portion between the left plate-shaped part 3*e* and the right plate-shaped part 3*f*. An average gain of the FM wave band of the AM/FM antenna can be improved by dividing the capacity loaded element 3 in the right-left direction in FIG. 29.

The present invention has been described above by taking the embodiments as examples, but it would be apparent to those skilled in the art that various modifications of each of the components and the processes of the embodiments can be made within the scope of the claims. Hereinafter, modified examples will be described.

Instead of the TEL antenna 2, the first antenna may be a TV antenna, a keyless entry antenna, an inter-vehicle communication antenna or a WiFi antenna. Instead of the AM/FM antenna, the second antenna may be a DAB (Digital Audio Broadcast) receiving antenna. The voltage maximum point of the capacity loaded element 3 can also be changed by adding a slit or having a folded-back shape in addition to the meander line 23 shown in FIG. 18.

DESCRIPTION OF REFERENCE SIGNS

1,1A to 1D ANTENNA DEVICE
2 TEL ANTENNA (FIRST ANTENNA)
3 CAPACITY LOADED ELEMENT (SECOND ANTENNA)
3*a* FIRST PLATE-SHAPED PART
3*b* SECOND PLATE-SHAPED PART
3*c* TONGUE PIECE PART
3*d* CUTOUT PART
3*e* LEFT PLATE-SHAPED PART
3*f* RIGHT PLATE-SHAPED PART
4 TEL ANTENNA SUBSTRATE
4*a* HELICAL ELEMENT CONNECTING HOLE
5 HELICAL ELEMENT (AM/FM COIL)
5*a* PULL-OUT PART
6 INNER CASE
6*a* GROOVE PART
7 HOLDER
7*a* HELICAL ELEMENT HOLDING PART
8 WATERPROOF PAD (WATERTIGHT SEALING MATERIAL)
9 AMPLIFIER SUBSTRATE
9*a*,9*b* CONDUCTOR PLATE SPRING (TERMINAL)
9*c* CONNECTOR
9*d* PROTRUSION
10 BASE
10*a* PROJECTION
10*b* CONNECTOR HOLE
11 BOLT (SCREW FOR VEHICLE BODY ATTACHMENT)
12 WASHER (CAPTURE PART)
13 CONNECTING PLATE
14 HOLDER
15 SEAL MEMBER
16 FILTER (BEF)
17,18 TERMINAL PART
19 FILTER (BPF)
20 OUTER CASE (EXTERIOR CASE)
21 GPS ANTENNA
22 XM ANTENNA
23 MEANDER LINE
25 PARASITIC ELEMENT

26 FILTER
101~106 SCREW

The invention claimed is:

1. An antenna device comprising:

a first antenna; and a second antenna including a capacitively loaded element which is located above the first antenna and a helical element which is electrically connected with the capacitively loaded element in a series connection, wherein at least a part of the first antenna overlaps the capacitively loaded element in a side view of the antenna device, wherein the capacitively loaded element is made of a conductive plate, and wherein a feeding point of the first antenna and a feeding point of the second antenna are different from each other.

2. The antenna device according to the claim 1, wherein the first antenna and the second antenna are separated members from each other.

3. The antenna device according to the claim 1, wherein the first antenna and the second antenna are electrically divided from each other.

4. The antenna device according to the claim 1, wherein a gap is provided in a side surface of the capacitively loaded element.

5. The antenna device according to the claim 1, wherein at least a part of the capacitively loaded element is divided in a left-right direction of the antenna device to define divided portions.

6. The antenna device according to the claim 5, wherein the divided portions of the capacitively loaded element are located to face each other.

7. The antenna device according to claim 1, wherein the first antenna and the second antenna are closely positioned.

8. The antenna device according to claim 1, wherein the second antenna has a curved shape defining an inner space such that at least part of the first antenna is disposed in the inner space and overlaps the capacitively loaded element in the side view of the antenna device.

* * * * *